United States Patent
Krauthamer

(10) Patent No.: US 10,828,576 B1
(45) Date of Patent: Nov. 10, 2020

(54) MOTION EXAGGERATING VIRTUAL REALITY RIDE SYSTEMS AND METHODS

(71) Applicant: Universal City Studios LLC, Universal City, CA (US)

(72) Inventor: Akiva Meir Krauthamer, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/524,939

(22) Filed: Jul. 29, 2019

(51) Int. Cl.
  *A63G 31/16* (2006.01)
  *A63G 31/02* (2006.01)
  *G06F 3/14* (2006.01)
  *G06F 3/01* (2006.01)
  *G06T 13/00* (2011.01)

(52) U.S. Cl.
  CPC ............ *A63G 31/16* (2013.01); *A63G 31/02* (2013.01); *G06F 3/011* (2013.01); *G06F 3/14* (2013.01)

(58) Field of Classification Search
  CPC .......... A63G 7/00; A63G 21/00; A63G 21/18; A63G 25/00; A63G 31/00; A63G 31/007; A63G 31/02; A63G 31/16; G06T 13/00; G06T 13/20
  USPC .... 472/13, 43, 59–61, 117, 128–129; 463/1, 463/2, 49, 52
  See application file for complete search history.

(56) References Cited

U.S. PATENT DOCUMENTS

| | | | | |
|---|---|---|---|---|
| 5,785,592 | A * | 7/1998 | Jacobsen | A63F 9/0291 463/7 |
| 6,179,619 | B1 * | 1/2001 | Tanaka | A63G 7/00 434/307 R |
| 6,220,965 | B1 * | 4/2001 | Hanna | A63G 7/00 463/52 |
| 9,459,692 | B1 | 10/2016 | Li | |
| 2014/0321708 | A1 | 10/2014 | Meier | |
| 2015/0100179 | A1 | 4/2015 | Alaniz et al. | |
| 2015/0325027 | A1 | 11/2015 | Herman et al. | |
| 2016/0048027 | A1 | 2/2016 | Shpigelman | |

(Continued)

FOREIGN PATENT DOCUMENTS

DE   102016224122 A1   6/2018

*Primary Examiner* — Kien T Nguyen
(74) *Attorney, Agent, or Firm* — Fletcher Yoder, P.C.

(57) ABSTRACT

Techniques for improving ride experience provided by a virtual reality ride system, which includes an electronic display that presents virtual reality image content to a rider of a ride vehicle, sensors that measure sensor data indicative of movement characteristics of the ride vehicle, and virtual reality processing circuitry. The virtual reality processing circuitry determines a predicted movement profile of the ride vehicle based on the sensor data, in which the predicted movement profile indicates that the ride vehicle is expected to move a predicted movement magnitude during a predicted movement duration, determines a target perceived movement magnitude greater than the predicted movement magnitude by applying a movement-exaggeration factor to the predicted movement magnitude, and determines movement-exaggerated virtual reality image content to be presented on the electronic display at least in part by adapting default virtual reality image content to incorporate the target perceived movement magnitude.

20 Claims, 6 Drawing Sheets

(56) References Cited

U.S. PATENT DOCUMENTS

| | | |
|---|---|---|
| 2016/0089610 A1* | 3/2016 | Boyle .................... A63F 13/65 463/7 |
| 2017/0103571 A1 | 4/2017 | Beaurepaire |
| 2017/0253252 A1 | 9/2017 | Donnelly et al. |
| 2017/0285732 A1 | 10/2017 | Daly et al. |
| 2017/0352185 A1 | 12/2017 | Bonilla Acevedo et al. |
| 2018/0040162 A1 | 2/2018 | Donnelly et al. |
| 2018/0053351 A1 | 2/2018 | Anderson |
| 2018/0081426 A1 | 3/2018 | Rothkopf |
| 2018/0096501 A1 | 4/2018 | Anderson et al. |
| 2019/0019329 A1 | 1/2019 | Eyler et al. |
| 2019/0043232 A1 | 2/2019 | Appakutty |
| 2019/0094540 A1 | 3/2019 | Greenwood et al. |

* cited by examiner

MOTION EXAGGERATING VIRTUAL REALITY RIDE SYSTEMS AND METHODS

BACKGROUND

The present disclosure generally relates to ride systems and, more particularly, to virtual reality (VR) ride systems implemented and/or operated to exaggerate physical motion (e.g., movement) experienced by a rider (e.g., user) to facilitate providing a more exhilarating ride experience.

This section is intended to introduce aspects of art that may be related to the techniques of the present disclosure, which are described and/or claimed below. This discussion is believed to be helpful in providing background information to facilitate a better understanding of the present disclosure. Accordingly, it should be understood that this section should be read in this light and not as an admission of prior art.

Ride systems, such as a roller coaster ride system, are often deployed at amusement parks, theme parks, carnivals, fairs, and/or the like. Generally, a ride system includes a ride environment and one or more ride vehicles, which are implemented and/or operated to carry (e.g., support) one or more riders through the ride environment. For example, a roller coaster ride system may include a track ride environment and a car ride vehicle. As another example, a lazy river ride system may include a pool ride environment and an inner tube ride vehicle. To facilitate providing a more exhilarating and/or different (e.g., simulated) ride experience, a ride system may be implemented and/or operated to present virtual reality content to its riders.

BRIEF DESCRIPTION OF THE DRAWINGS

Various aspects of the present disclosure may be better understood upon reading the detailed description and upon reference to the drawings, in which.

SUMMARY

Figure 1:
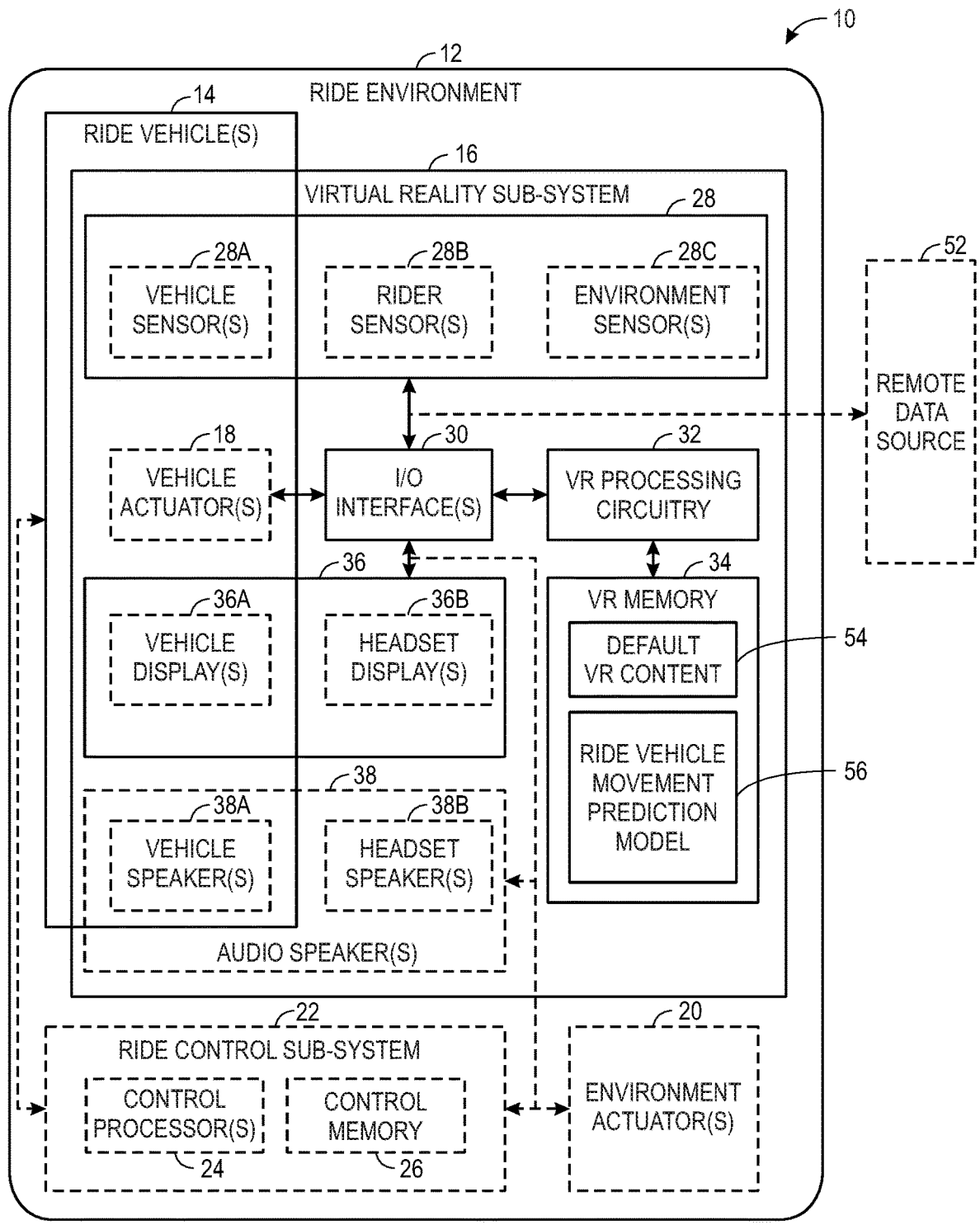
FIG. 1 is a block diagram of a virtual reality ride system including a virtual reality sub-system, in accordance with an embodiment of the present disclosure.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a virtual reality ride system includes an electronic display that present virtual reality image content to a rider while the rider is being carried through a ride environment by a ride vehicle, one or more sensors that determine sensor data indicative of movement characteristics of the ride vehicle in the ride environment, and virtual reality processing circuitry communicatively coupled to the electronic display and the one or more sensors. The virtual reality processing circuitry determines a predicted movement profile of the ride vehicle based at least in part on the sensor data received from the one or more sensors, in which the predicted movement profile indicates that the ride vehicle is expected to move a predicted movement magnitude during a predicted movement duration, determines a target perceived movement magnitude greater than the predicted movement magnitude at least in part by applying a movement-exaggeration factor to the predicted movement magnitude, and determines movement-exaggerated virtual reality image content to be presented on the electronic display during the predicted movement duration at least in part by adapting default virtual reality image content to incorporate the target perceived movement magnitude.

In an embodiment, a method of operating a virtual reality ride system includes receiving, using processing circuitry implemented in the virtual reality ride system, sensor data determined by one or more sensors while a ride vehicle is moving through a ride environment of the virtual reality ride system, predicting, using the processing circuitry, a movement magnitude that the ride vehicle will experience at a time during a prediction horizon based at least in part on the sensor data received from the one or more sensors, applying, using the processing circuitry, one or more movement-exaggeration factors to the movement magnitude that the ride vehicle is predicted to experience at the time during the prediction horizon to determine a target perceived movement magnitude that differs from the movement magnitude that the ride vehicle is predicted to experience, and adapting, using the processing circuitry, default virtual reality content corresponding with the time during the prediction horizon based at least in part on the target perceived movement magnitude to determine movement-exaggerated virtual reality content to be presented to a rider of the ride vehicle at the time.

In an embodiment, a tangible, non-transitory, computer readable medium stores instructions executable by one or more processors of a virtual reality ride system. The instructions include instructions to determine, using the one or more processors, sensor data measured by one or more sensors as a ride vehicle is carrying a rider through a ride environment of the virtual reality ride system, determine, using the one or more processors, a predicted movement magnitude of the ride vehicle that is predicted to occur during a subsequent time period based at least in part on the sensor data measured by the one or more sensors; and determine, using the one or more processors, movement-exaggerated virtual reality image content based at least in part on the predicted movement magnitude such that presentation of the movement-exaggerated virtual reality image to the rider results in a perceived movement magnitude that differs from the predicted movement magnitude of the ride vehicle.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Ride systems are often deployed at amusement parks, theme parks, carnivals, fairs, and/or the like. Generally, a ride system includes a ride environment and one or more ride vehicles, which are implemented and/or operated to carry (e.g., support) one or more riders through the ride environment. For example, a lazy river ride system may include a pool ride environment and one or more inner tube ride vehicles. As another example, a log flume ride system may include a flume ride environment and one or more artificial log ride vehicles. As a further example, a boat ride system may include a water body ride environment and one or more boat ride vehicles. Accordingly, physical (e.g., actual and/or real) movement (e.g., motion) of a rider on a ride system may generally be dependent on movement of a ride vehicle carrying the rider.

To facilitate providing a more exhilarating and/or different (e.g., simulated) ride experience, a ride system may be implemented and/or operated to present virtual reality (VR) content to its riders. For example, a virtual reality ride system may be implemented and/or operated to artificially produce one or more sensory stimuli, such as an audio (e.g., sound) stimuli, a tactile (e.g., haptic) stimuli, and/or a visual (e.g., optical) stimuli. To facilitate artificially producing visual stimuli, a virtual reality ride system may include one or more electronic displays, such as a vehicle display and/or a head-mounted display, implemented and/or operated to display (e.g., present) virtual reality image content.

Generally, visual stimuli are perceived by a human's visual system. In fact, at least in some instances, changes in perceived visual stimuli over time may enable a human to detect motion (e.g., movement). For example, when a perceived visual stimuli is translated left over time, the human may perceive (e.g., determine and/or detect) that he/she is moving right relative to the perceived visual stimuli or vice versa. Additionally or alternatively, when a perceived visual stimuli is translated upward over time, the human may perceive that he/she is moving downward relative to the perceived visual stimuli or vice versa.

Movement of a human may additionally or alternatively be perceived by the human's vestibular system (e.g., inner ear). In other words, at least in some instances, movement of a human may be perceived by the human's vestibular system as well as by the human's visual system. However, at least in some instances, a mismatch between the movement perceived by the human's vestibular system and the movement perceived by the human's visual system may result in the human experiencing motion sickness.

In other words, at least in some instances, a rider on a virtual reality ride system may experience motion sickness, which affects (e.g., reduces and/or degrades) the ride experience, when visually perceived movement does not match movement perceived by the rider's vestibular system. As described above, a ride vehicle may carry a rider through a ride environment of a virtual reality ride system and, thus, movement of the rider may be dependent at least in part on movement of the ride vehicle. Thus, to facilitate reducing likelihood of producing motion sickness, a virtual reality ride system may coordinate virtual reality content with physical ride vehicle movement. For example, the virtual reality ride system may display virtual reality image content that is expected to result in characteristics, such as magnitude, time, duration, and/or direction, of visually perceived movement matching corresponding characteristics of movement perceived by the rider's vestibular system.

In other words, to facilitate reducing likelihood of producing motion sickness, in some instances, a virtual reality ride system may generate virtual reality image content based at least in part on characteristics of physical (e.g., actual and/or real) movement of a ride vehicle and, thus, a rider carried by the ride vehicle. For example, when the ride vehicle moves in an upward direction a magnitude of five meters, the virtual reality ride system may present virtual reality image content that is expected to result in a rider visually perceiving an upward movement of five meters. However, at least in some instances, implementing a virtual reality ride system in this manner may limit magnitude (e.g., distance) of movement visually perceived from virtual reality content and, thus, exhilaration (e.g., excitement) provided by the virtual reality ride system to the magnitude of the physical movement. In other words, at least in some instances, presenting virtual reality content that results in magnitudes of perceived movement exactly matching may limit exhilaration and, thus, ride experience provided by a virtual reality ride system.

Accordingly, to facilitate improving ride experience, the present disclosure provides techniques for implementing and/or operating a virtual reality ride system to present virtual reality content that exaggerates (e.g., increases and/or amplifies) physical movement (e.g., motion) experienced by a ride vehicle and, thus, a rider being carried by the ride vehicle. To facilitate providing a virtual reality ride experience, a virtual reality ride system may include a virtual reality sub-system implemented and/or operated to generate virtual reality content, such as virtual reality image content to be presented (e.g., displayed) on an electronic display. The virtual reality sub-system may additionally be implemented and/or operated to present the virtual reality content, for example, by displaying the virtual reality image content on the electronic display based at least in part on corresponding image data.

As described above, to facilitate reducing likelihood of producing motion sickness, a virtual reality ride system may present virtual reality content to a rider of a ride vehicle such that movement perceived from the virtual reality content is coordinated with physical (e.g., real and/or actual) movement of the ride vehicle. For example, to compensate for physical movement of a ride vehicle, the virtual reality ride system may generate and display virtual reality image content that results in visually perceived movement occurring at approximately the same time, for approximately the same duration, and/or in approximately the same direction as the physical movement of the ride vehicle. In fact, in some embodiments, the virtual reality ride system may generate movement-coordinated virtual reality content by adapting (e.g., adjusting) default virtual reality content, for example, which corresponds with a default (e.g., stationary and/or planned) ride vehicle movement profile.

To facilitate coordinating presentation of virtual reality content with physical movement of a ride vehicle, a virtual reality ride system may include one or more sensors, such as a vehicle sensor, a rider (e.g., head-mounted display) sensor, and/or an environment sensor. For example, a ride vehicle may include one or more vehicle sensors, such as a gyroscope and/or accelerometer, which are implemented and/or operated to sense (e.g., measure and/or determine) characteristics of ride vehicle movement, such as movement time, movement duration, movement direction (e.g., orientation), and/or movement magnitude (e.g., distance). As such, in some embodiments, a virtual reality ride system may coordinate presentation of virtual reality content with ride vehicle movement at least in part by presenting movement-coordinated virtual reality content at approximately the same time as sensor data indicative of occurrence of the ride vehicle movement is determined (e.g., sensed and/or measured).

However, at least in some instances, generation and/or presentation (e.g., display) of virtual reality content is generally non-instantaneous. In other words, at least in some such instances, reactively generating and/or presenting virtual reality content may result in presentation of movement-coordinated virtual reality content being delayed relative to a corresponding ride vehicle movement. Merely as an illustrative non-limiting example, due to the non-instantaneous nature, reactively generating and/or presenting movement-coordinated virtual reality image content may result in the movement-coordinated virtual reality image content being displayed after the corresponding ride vehicle movement has already occurred, which, at least in some instances, may result in increased motion sickness.

Thus, to facilitate coordinating presentation of movement-coordinated virtual reality content with a corresponding ride vehicle movement, in some embodiments, a virtual reality ride system may predict characteristics, such as movement time, movement duration, movement direction, and/or movement magnitude, of the ride vehicle movement over a prediction horizon (e.g., subsequent period of time). In other words, in such embodiments, the virtual reality ride system may determine a predicted ride vehicle movement profile (e.g., trajectory) over the prediction horizon. For example, the predicted ride vehicle movement profile may indicate that a corresponding ride vehicle moves a first distance (e.g., magnitude) in a first direction from a first time to a second (e.g., subsequent) time, a second distance in a second direction from the second time to a third (e.g., subsequent) time, and so on.

To facilitate determining a predicted ride vehicle movement profile, in some embodiments, a virtual reality ride system may utilize a ride vehicle movement prediction model that describes expected relationships between characteristics of ride vehicle movement and sensor data, for example, received from a vehicle sensor deployed on a ride vehicle, a rider sensor associated with a rider, and/or an environment sensor deployed in a ride environment. Thus, in such embodiments, the virtual reality ride system may determine a predicted ride vehicle movement profile at least in part by supplying (e.g., inputting) the sensor data to the ride vehicle movement prediction model. In some embodiments, a ride vehicle movement prediction model may additionally describe expected relationships between characteristics of ride vehicle movement and one or more control commands used to control operation of a ride vehicle. Furthermore, in some embodiments, a ride vehicle movement prediction model may describe expected relationships between characteristics of ride vehicle movement and a default (e.g., planned) movement profile of a ride vehicle.

Based on a predicted ride vehicle movement profile (e.g., predicted ride vehicle movement characteristics over time), a virtual reality ride system may preemptively (e.g., predictively) generate and/or present movement-coordinated virtual reality content. For example, in some embodiments, the virtual reality ride system may generate and/or display movement-coordinated virtual reality image content with a target display time set to match the predicted movement time of a corresponding ride vehicle movement. Additionally, in some embodiments, the virtual reality ride system may generate and/or display movement-coordinated virtual reality image content with a target display duration set to match the predicted movement duration of a corresponding ride vehicle movement. Furthermore, in some embodiments, the virtual reality ride system may generate and/or display movement-coordinated virtual reality image content to produce a visually perceived movement direction that matches the predicted movement direction (e.g., orientation) of a corresponding ride vehicle movement. Moreover, in some embodiments, the virtual reality ride system may generate and/or display movement-coordinated virtual reality image content based at least in part on the predicted movement magnitude (e.g., distance) of a corresponding ride vehicle movement.

In some embodiments, movement-coordinated virtual reality content may be presented to produce a perceived movement magnitude that does not exactly match the predicted movement magnitude (e.g., distance) of a corresponding ride vehicle movement. In other words, in such embodiments, a virtual reality ride system may generate the movement-coordinated virtual reality content based on a target perceived movement magnitude that differs from the predicted movement magnitude of the corresponding ride vehicle movement. For example, the target perceived ride vehicle movement magnitude may be greater than the predicted ride vehicle movement magnitude to facilitate providing a more exhilarating and, thus, improved ride experience.

To facilitate determining a target perceived ride vehicle movement magnitude greater than a corresponding predicted ride vehicle movement magnitude, in some embodiments, a virtual reality ride system may determine one or more movement-exaggeration factors to be applied to the predicted ride vehicle movement magnitude. For example, the movement-exaggeration factors may include one or more offset values, which when applied, bias the target perceived ride vehicle movement magnitude relative to the predicted ride vehicle movement magnitude. Additionally or alternatively, the movement-exaggeration factors may include one or more gain values, which when applied, scale the target perceived ride vehicle movement magnitude relative to the predicted ride vehicle movement magnitude.

However, presenting movement-coordinated virtual reality content generated based on a target perceived ride vehicle movement magnitude that differs from a corresponding predicted ride vehicle movement magnitude may produce a mismatch between perceived movement magnitudes, which potentially causes motion sickness and, thus, affects (e.g., reduces) the ride experience provided by a virtual reality ride system.

To facilitate improving ride experience, in some embodiments, the value of one or more movement-exaggeration factors may be calibrated (e.g., tuned) via a calibration (e.g., tuning) process, for example, performed offline at least in part by a design system and/or a design device in the design system. During the calibration process, in some embodiments, a design device may determine and evaluate one or more candidate movement-exaggeration factors. For example, the candidate movement-exaggeration factors may include a first candidate movement-exaggeration factor with a largest (e.g., first) value, a second candidate movement-exaggeration factor with a next largest (e.g., second) value, and so on.

To select a movement-exaggeration factor from the multiple candidates during the calibration process, in some embodiments, the design device may successively (e.g., sequentially and/or serially) evaluate whether the candidate movement-exaggeration factors result in motion sickness, for example, progressing from the largest value candidate movement-exaggeration factor to the smallest value candidate movement-exaggeration factor To help illustrate, continuing with the above example, the design device may evaluate whether the first candidate movement-exaggeration factor, which has the largest value of the candidates, results in motion sickness, for example, based on a user input received from a user (e.g., rider) presented with movement-exaggerated (e.g., coordinated) virtual reality content generated using the first candidate movement-exaggeration factor When motion sickness does not result, the design device may select the first candidate as the movement-exaggeration factor to be used to by a virtual reality ride system to generate subsequent movement-coordinated virtual reality content, for example, by storing it in the virtual reality ride system.

When the first candidate movement-exaggeration factor results in motion sickness, the design device may evaluate whether the second candidate movement-exaggeration factor, which has the next largest value of the candidates, results in motion sickness, for example, based on a user input received from a user presented with movement-exaggerated virtual reality content generated using the second candidate movement-exaggeration factor. When motion sickness does not result, the design device may select the second candidate as the movement-exaggeration factor to be used to by the virtual reality ride system to generate subsequent movement-coordinated virtual reality content, for example, by storing it in the virtual reality ride system. On the other hand, the design device may continue progressing through one or more of the remaining candidate movement-exaggeration factors in a similar manner when the second candidate movement-exaggeration factor results in motion sickness.

In this manner, the techniques described in the present disclosure may facilitate reducing likelihood of a virtual reality ride system producing motion sickness, which, at least in some instances, may facilitate improving the ride experience provided by the virtual reality ride system. However, instead of merely coordinating virtual reality content with ride vehicle movement to reduce likelihood of producing motion sickness, the techniques described in the present disclosure may enable a virtual reality ride system to present virtual reality content that exaggerates physical (e.g., real and/or actual) ride vehicle movement. In other words, as will be described in more detail below, the techniques described in the present disclosure may enable a virtual reality ride system to present virtual reality content that is not limited to the magnitude of ride vehicle movement with reduced likelihood of producing motion sickness, which may facilitate providing a more exhilarating and, thus, improved ride experience.

To help illustrate, an example of a virtual reality ride system 10, which includes a ride environment 12, one or more ride vehicles 14, and a virtual reality sub-system 16, is shown in FIG. 1. In some embodiments, the virtual reality ride system 10 may be deployed at an amusement park, a theme park, a carnival, a fair, and/or the like. Additionally, in some embodiments, the virtual reality ride system 10 may be a roller coaster ride system, a lazy river ride system, a log flume ride system, a boat ride system, or the like.

However, it should be appreciated that the depicted example is merely intended to be illustrate and not limiting. For example, in other embodiments, the virtual reality sub-system 16 may be remote from the one or more ride vehicles 14 and/or the ride environment 12. Additionally or alternatively, in other embodiments, the virtual reality sub-system 16 may be fully included in one or more ride vehicles 14. In any case, a ride vehicle 14 may generally be implemented and/or operated to carry (e.g., support) one or more riders (e.g., users) through the ride environment 12 of the virtual reality ride system 10. Accordingly, physical (e.g., actual and/or real) movement (e.g., motion) of a rider in the ride environment 12 may generally be dependent on physical movement of a ride vehicle 14 carrying the rider.

To facilitate controlling movement of a ride vehicle 14, the ride vehicle 14 may include one or more vehicle actuators 18. For example, the vehicle actuators 18 may include a steering wheel and/or a rudder that enables controlling movement direction of the ride vehicle 14. In some embodiments, a ride vehicle 14 may additionally or alternatively include one or more haptic vehicle actuators 18 implemented and/or operated to present virtual reality tactile content. Furthermore, in some embodiments, the vehicle actuators 18 may include an engine, a motor, and/or a brake that enables controlling movement speed of the ride vehicle 14. In other embodiments, one or more vehicle actuators 18 may not be implemented in a ride vehicle 14, for example, when movement of an inner tube ride vehicle 14 is instead controlled by propulsion produced by a rider and/or propulsion produced by the ride environment 12.

To facilitate producing ride environment propulsion, as in the depicted example, one or more environment actuators 20 may be deployed in the ride environment 12. For example, the environment actuators 20 may include an engine and/or a motor that is implemented and/or operated to push or pull a ride vehicle 14 through the ride environment 12. Additionally or alternatively, the environment actuators 20 may include a brake that is implemented and/or operated to slow or stop a ride vehicle 14 in the ride environment 12. Furthermore, in some embodiments, the environment actuators 20 may include a pressurized air blower or an accordion mechanism that is implemented and/or operated to artificially produce waves in the ride environment 12. In other embodiments, one or more environment actuators 20 may not be implemented in the ride environment 12, for example, when movement of an inner tube ride vehicle 14 is instead controlled by propulsion produced by a rider, propulsion produced by one or more vehicle actuators 18, and/or propulsion naturally occurring in the ride environment 12.

As in the depicted example, the virtual reality ride system 10 may additionally include a ride control sub-system 22, which is implemented and/or operated to generally control operation of one or more vehicle actuators 18 and/or one or more environment actuators 20. To facilitate controlling operation, the ride control sub-system 22 may include one or more control processors 24 (e.g., control circuitry and/or processing circuitry) and control memory 26. In some embodiments, a control processor 24 may execute instruction stored in the control memory 26 to perform operations, such as generating a control command that instructs a vehicle actuator 18 and/or an environment actuator 20 to perform a control action (e.g., actuate). Additionally or alternatively, a control processor 24 may operate based on circuit connections formed therein. As such, in some embodiments, the one or more control processors 24 may include one or more general purpose microprocessors, one or more application specific processors (ASICs), one or more field programmable logic arrays (FPGAs), or any combination thereof.

In addition to instructions, in some embodiments, the control memory 26 may store data, such as sensor data received from one or more sensors 28. Thus, in some embodiments, the control memory 26 may include one or more tangible, non-transitory, computer-readable media that store instructions executable by processing circuitry, such as a control processor 24, and/or data to be processed by the processing circuitry. For example, the control memory 26 may include one or more random access memory (RAM) devices, one or more read only memory (ROM) devices, one or more rewritable non-volatile memory devices, such as a flash memory drive, a hard disk drive, an optical disc drive, and/or the like. In other embodiments, a ride control sub-system 22 may be obviated and, thus, not included in a virtual reality ride system 10, for example, when the virtual reality ride system 10 does not include vehicle actuators 18 and/or environment actuators 20.

In any case, as in the depicted example, the virtual reality sub-system 16 may include one or more sensors 28, one or more input/output (I/O) interfaces 30, virtual reality (VR) processing circuitry 32, virtual reality (VR) memory 34, and one or more electronic displays 36. In particular, the virtual reality processing circuitry 32 may be communicatively coupled to the one or more I/O interfaces 30. In some embodiments, virtual reality processing circuitry 32 may execute instruction stored in the virtual reality memory 34 to perform operations, such as determining a predicted movement profile of a ride vehicle 14 and/or generating virtual reality content. Additionally or alternatively, the virtual reality processing circuitry 32 may operate based on circuit connections formed therein. As such, in some embodiments, the virtual reality processing circuitry 32 may include one or more general purpose microprocessors, one or more application specific processors (ASICs), one or more field programmable logic arrays (FPGAs), or any combination thereof.

As in the depicted example, the one or more electronic displays 36 may also be communicatively coupled to the one or more I/O interfaces 30, for example, to enable the virtual reality processing circuitry 32 to supply image data corresponding with virtual reality image content to the one or more electronic displays 36. In some embodiments, the virtual reality sub-system 16 may include one or more electronic displays 36 integrated with a ride vehicle 14 as a vehicle display 36A. Additionally or alternatively, the virtual reality sub-system 16 may include one or more electronic displays 36 implemented separately (e.g., independent and/or distinct) from the ride vehicles 14, for example, as a headset display (e.g., head-mounted display (HMD)) 36B.

Furthermore, as in the depicted example, the virtual reality sub-system 16 may include one or more audio speakers 38. In particular, the one or more audio speakers 38 may also be communicatively coupled to the one or more I/O interfaces 30, for example, to enable the virtual reality processing circuitry 32 to supply audio data corresponding with virtual reality audio content to the one or more audio speakers 38. In some embodiments, the virtual reality sub-system 16 may include one or more audio speakers 38 integrated with a ride vehicle 14 as a vehicle speaker 38A. Additionally or alternatively, the virtual reality sub-system 16 may include one or more audio speakers 38 implemented separately (e.g., independent and/or distinct) from the ride vehicles 14, for example, as a headset (e.g., head-mounted) speaker 38B.

Similarly, in some embodiments, one or more haptic vehicle actuators 18 may be communicatively coupled to the one or more I/O interfaces 30, for example, to enable the virtual reality processing circuitry 32 to supply control commands (e.g., haptic data) corresponding with virtual reality tactile content to the one or more haptic vehicle actuators 18. However, in other embodiments, vehicle actuators 18 may not be included in a virtual reality sub-system 16, for example, when the vehicle actuators 18 are not haptic vehicle actuators 18 implemented and/or operated to present virtual reality tactile content. Additionally or alternatively, audio speakers 38 may not be included in a virtual reality sub-system 16, for example, when the audio speakers 38 are not implemented and/or operated to present virtual reality audio content.

Moreover, the one or more sensors 28 may be communicatively coupled to the one or more I/O interfaces 30, for example, to enable the virtual reality processing circuitry 32 to receive sensor data from the one or more sensors 28. In some embodiments, the virtual reality sub-system 16 may include one or more inertial motion sensors 28, such as an accelerometer, a gyroscope, and/or a magnetometer. Additionally or alternatively, the virtual reality sub-system 16 may include one or more proximity sensors 28, such as a sonar sensor 28, a radio detection and ranging (RADAR) sensor 28, and/or a light detection and ranging (LIDAR) sensor 28. In some embodiments, the virtual reality sub-system 16 may additionally or alternatively include one or more location sensors 28, such as a global positioning system (GPS) sensor (e.g., receiver) 28.

Furthermore, as in the depicted example, one or more vehicle sensors 28A may be deployed at a ride vehicle 14, for example, to determine (e.g., sense and/or measure) sensor data indicative of pose of the ride vehicle 14, location of the ride vehicle 14, previous movement characteristics (e.g., profile) of the ride vehicle 14, and/or current movement characteristics of the ride vehicle 14. In some embodiments, the virtual reality sub-system 16 may additionally or alternatively include one or more rider sensors 28B, for example, implemented and/or operated to determine sensor data indicative of rider pose. Moreover, in some embodiments, the virtual reality sub-system 16 may additionally or alternatively include one or more environment sensors deployed in the ride environment 12, for example, to determine sensor data indicative of location of a ride vehicle 14 in the ride environment 12, previous movement characteristics of the ride vehicle 14 in the ride environment 12, current movement characteristics (e.g., profile) of the ride vehicle 14 in the ride environment 12, and/or characteristics of other movement in the ride environment 12.

Figure 2:
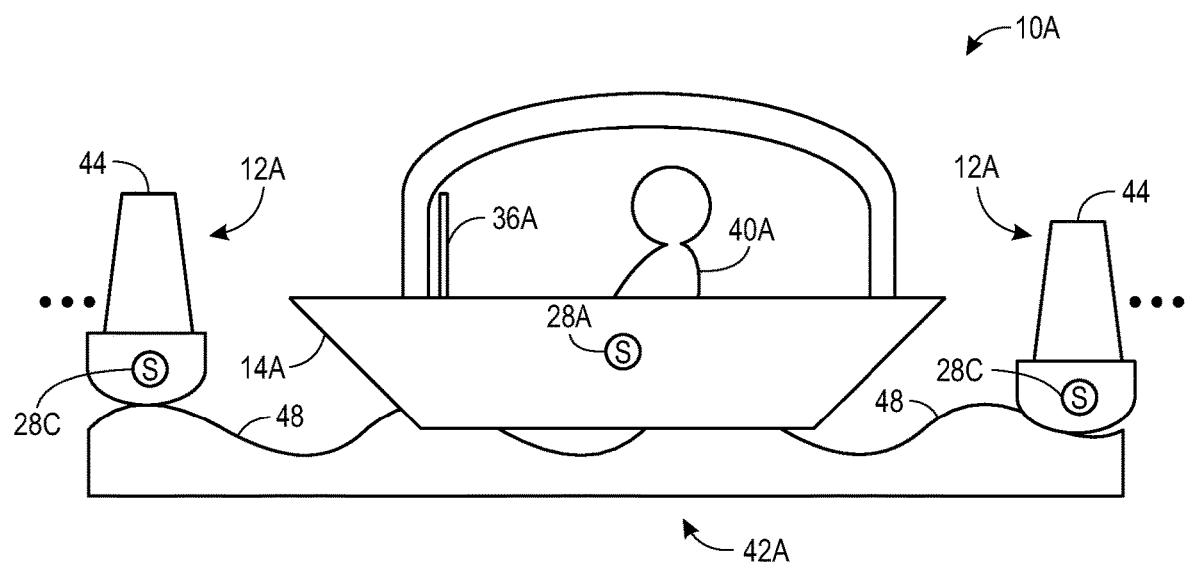
FIG. 2 is an example of the virtual reality ride system of FIG. 1, in accordance with an embodiment of the present disclosure.
Figure 3:
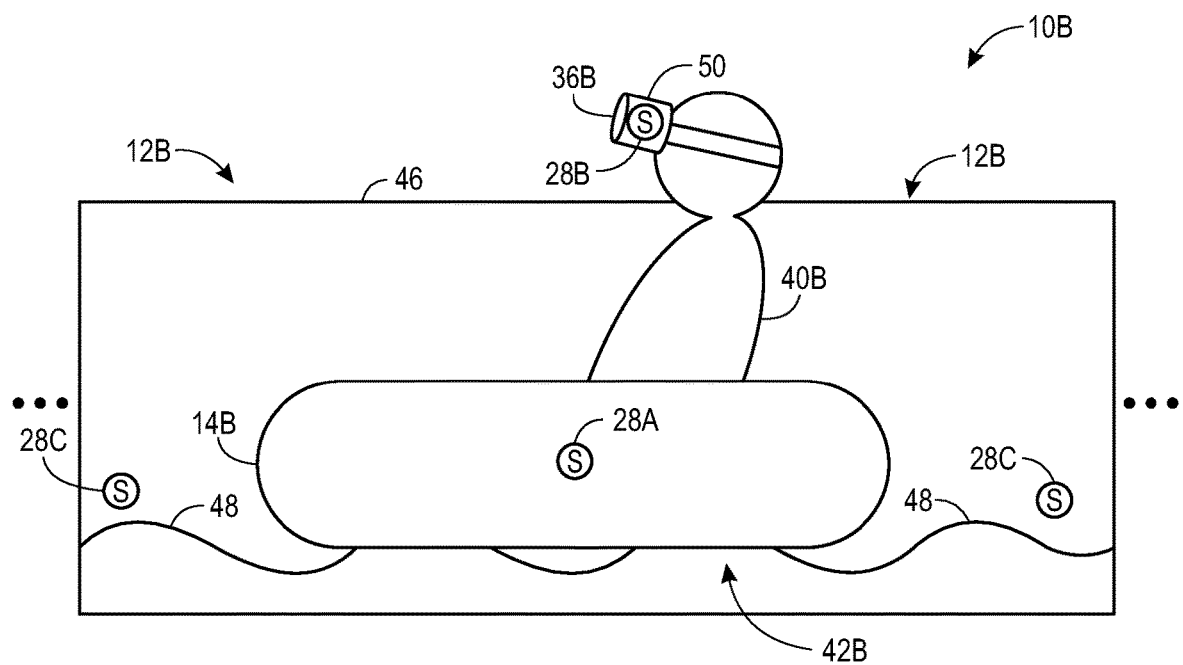
FIG. 3 is another example of the virtual reality ride system of FIG. 1, in accordance with an embodiment of the present disclosure.

To help illustrate, an example of a portion of a virtual reality ride system 10A is shown in FIG. 2 and an example of a portion of another virtual reality ride system 10B is shown in FIG. 3. In particular, the virtual reality ride system 10A of FIG. 2 may be a boat ride system 10 and the virtual reality ride system 10B of FIG. 3 may be a lazy river ride system 10. However, it should be appreciated that the techniques described in the present disclosure may additionally or alternatively be used to implement and/or operate other types of virtual reality ride systems 10, such as a roller coaster ride system, a log flume ride system, a drop tower ride system, a pendulum ride system, a swing ride system, a pirate ship ride system, a scrambler ride system, a robotic arm ride system, and/or the like.

As depicted, the virtual reality ride system 10A of FIG. 2 and the virtual reality ride system 10B of FIG. 3 each includes a ride vehicle 14 carrying a rider 40 in a ride environment 12. In particular, the ride vehicle 14A of FIG. 2 may be a boat ride vehicle 14 and the ride environment 12A of FIG. 2 may include a water body 42A (e.g., a pool, a lake, a river, and/or the like) and multiple buoys 44 floating on the water body 42A. On the other hand, the ride vehicle 14B of FIG. 3 may be an inner tube ride vehicle 14 and the ride environment 12B of FIG. 3 may include a water body 42B (e.g., a pool, a lake, a river, and/or the like) and a wall 46 implemented along (e.g., enclosing) the water body 42B.

Additionally, as depicted, the ride vehicle 14A of FIG. 2 and the ride vehicle 14B of FIG. 3 each floats on a corresponding water body 42 and, thus, move with waves 48 therein. Furthermore, as depicted, the rider 40A in FIG. 2 and the rider 40B in FIG. 3 each has access to an electronic display 36, for example, which is implemented and/or operated to display virtual reality image content. In particular, the rider 40A in FIG. 2 has access to a vehicle display 36A integrated with (e.g., coupled to) the ride vehicle 14A. On the other hand, the rider 40B in FIG. 3 has access to a headset display 36B, for example, implemented in a headset 50 along with one or more rider sensors 28B.

To facilitate reducing likelihood of producing motion sickness, a virtual reality ride system 10 may coordinate presentation of virtual reality content, such as virtual reality image content displayed on an electronic display 36 carried by a ride vehicle 14, with physical movement (e.g., motion) of the ride vehicle 14. Additionally, as described above, the ride vehicle 14A of FIG. 2 and the ride vehicle 14B of FIG. 3 may each move with waves 48 in a corresponding water body 42. In some embodiments, the virtual reality ride system 10 may controllably produce at least a portion of the waves 48, for example, at least in part by controlling operation of an environment actuator 20 and/or a vehicle actuator 18.

However, waves 48 in a water body 42 may additionally or alternatively be produced by factors outside the control of a virtual reality ride system 10, such as a sudden gust of wind and/or a change in gravitational force exerted on the water body 42. Moreover, the movement profile of the ride vehicle 14 resulting from interaction with a wave 48 may also vary with factors outside the control of a virtual reality ride system 10, such as weight of a rider 40 carried by the ride vehicle 14. Since such factors often vary over time, at least in some instances, the movement profile of a ride vehicle 14 may vary between different passes (e.g., cycles or rides) through a corresponding ride environment 12. In other words, at least in some instances, the actual movement profile of a ride vehicle 14 during a pass through a corresponding ride environment 12 may differ from its planned (e.g., default) movement profile.

To facilitate reducing likelihood of producing motion sickness during a pass through a ride environment 12, the virtual reality ride system 10 may adaptively predict the movement profile of the ride vehicle 14 based at least in part on sensor data determined by one or more of its sensors 28 during the pass and/or during one or more previous passes through the ride environment 12. As depicted, the virtual reality ride systems 10 each include multiple environment sensors 28C deployed in its ride environment 12. In particular, the environment sensors 28C of FIG. 2 are deployed on the buoys 44 in the ride environment 12A and the environment sensors 28C of FIG. 3 are deployed along the wall 46 in the ride environment 12B.

In some embodiments, the environment sensors 28C include one or more proximity sensors 28, such as a RADAR sensor 28 or a LIDAR sensor 28, and, thus, operate to determine (e.g., sense or measure) sensor data indicative of distance between the proximity environment sensor 28C and a physical object. For example, a proximity environment sensor 28C implemented on a buoy 44 in FIG. 2 may determine sensor data indicative of distance between the buoy 44 and the ride vehicle 14A. Additionally or alternatively, a proximity environment sensor 28C implemented at a point on the wall 46 in FIG. 2 may determine sensor data indicative of distance between the point on the wall 46 and the ride vehicle 14B. In fact, in some embodiments, a virtual reality ride system 10 may triangulate the distance of a ride vehicle 14 from multiple proximity environment sensors 28C to determine the location of the ride vehicle 14 in a corresponding ride environment 12.

Furthermore, in some embodiments, the environment sensors 28C additionally or alternatively include an inertial motion sensor 28, such as an accelerometer and/or a gyroscope, and, thus, operate to determine sensor data indicative of movement of the inertial movement sensor 28. For example, an inertial motion environment sensor 28C implemented on a buoy 44 in FIG. 2 may determine sensor data indicative of movement of the buoy 44. In other words, since the buoy 44 floats on the water body 42A of FIG. 2, sensor data determined by an inertial motion environment sensor 28C implemented thereon may be indicative of the movement characteristics of waves 48 in the water body 42A.

As depicted, the ride vehicle 14A of FIG. 2 and the ride vehicle 14B of FIG. 3 each includes a vehicle sensor 28A. In some embodiments, the vehicle sensor 28A may be an inertial motion sensor 28, such as an accelerometer and/or a gyroscope, and, thus, operate to determine (e.g., sense or measure) sensor data indicative of movement of the corresponding ride vehicle 14. Additionally or alternatively, the vehicle sensor 28A may be a proximity sensors 28, such as a RADAR sensor 28 or a LIDAR sensor 28, and, thus, operate to determine (e.g., sense or measure) sensor data indicative of distance between the corresponding ride vehicle 14 and a physical object. For example, a proximity vehicle sensor 28A deployed on the ride vehicle 14A of FIG. 2 may determine sensor data indicative of distance from a buoy 44 floating on the water body 42A, distance from another ride vehicle 14 in the ride environment 12A, and/or distance from a wave 48 in the water body 42A. Similarly, a proximity vehicle sensor 28A deployed on the ride vehicle 14B of FIG. 2 may determine sensor data indicative of distance from the wall 46 running along the water body 42B, distance from another ride vehicle 14 in the ride environment 12B, and/or distance from a wave 48 in the water body 42B.

Returning to the virtual reality ride system 10 of FIG. 1, as described above, the virtual reality processing circuitry 32 may receive sensor data from one or more sensors 28 via one or more I/O interfaces 30 in the virtual reality sub-system 16. Additionally, as in the depicted example, a remote data source 52 may be communicatively coupled to the one or more I/O interfaces 30 and, thus, virtual reality processing circuitry 32 in the virtual reality sub-system 16. For example, the remote data source 52 may be a weather forecast server (e.g., database) that stores sensor data indicative of current weather conditions and/or predicted sensor data indicative of forecast (e.g., future) weather conditions.

However, it should again be appreciated that the depicted example is intended to be illustrative and not limiting. In particular, in other embodiments, data received from a remote data source 52 may be obviated, for example, by sensor data received from one or more sensors 28 in a virtual reality sub-system 16. Thus, in such embodiments, the remote data source 52 may not be included in and/or communicatively coupled to a corresponding virtual reality ride system 10.

In any case, as described above, the virtual reality processing circuitry 32 may operate to determine a predicted movement profile (e.g., trajectory) of a ride vehicle 14 based at least in part on received sensor data. Additionally, as described above, the virtual reality processing circuitry 32 may operate to generate movement-coordinated virtual reality content based at least in part on the predicted movement profile of the ride vehicle 14. Furthermore, as described above, in some embodiments, the virtual reality processing circuitry 32 may operate at least in part by executing instructions stored in the virtual reality memory 34, for example, to process data stored in the virtual reality memory 34.

As such, in some embodiments, the virtual reality memory 34 may include one or more tangible, non-transitory, computer-readable media that store instructions executable by processing circuitry, such as virtual reality processing circuitry 32, and/or data to be processed by the processing circuitry. For example, the virtual reality memory 34 may include one or more random access memory (RAM) devices, one or more read only memory (ROM) devices, one or more rewritable non-volatile memory devices, such as a flash memory drive, a hard disk drive, an optical disc drive, and/or the like. As in the depicted example, the data and/or instructions stored in the virtual reality memory 34 may include default virtual reality (VR) content 54 and a ride vehicle movement prediction model 56.

In some embodiments, the default virtual reality content 54 may correspond with virtual reality content, such as virtual reality image content and/or virtual reality audio content, that is to be presented to a rider 40 when a corresponding ride vehicle 14 follows a default (e.g., planned or stationary) movement profile. Thus, as will be described in more detail below, in some embodiments, the virtual reality sub-system 16 may generate movement-coordinated virtual reality content, such as movement-coordinated virtual reality image content and/or movement-coordinated virtual reality audio content, at least in part by adjusting the default virtual reality content 54 based at least in part on deviation of a predicted movement profile of the ride vehicle 14 from its default movement profile. Additionally, in some embodiments, the virtual reality sub-system 16 may determine the predicted movement profile of the ride vehicle 14 by executing the ride vehicle movement prediction model 56 based at least in part on received sensor data.

Figure 4:
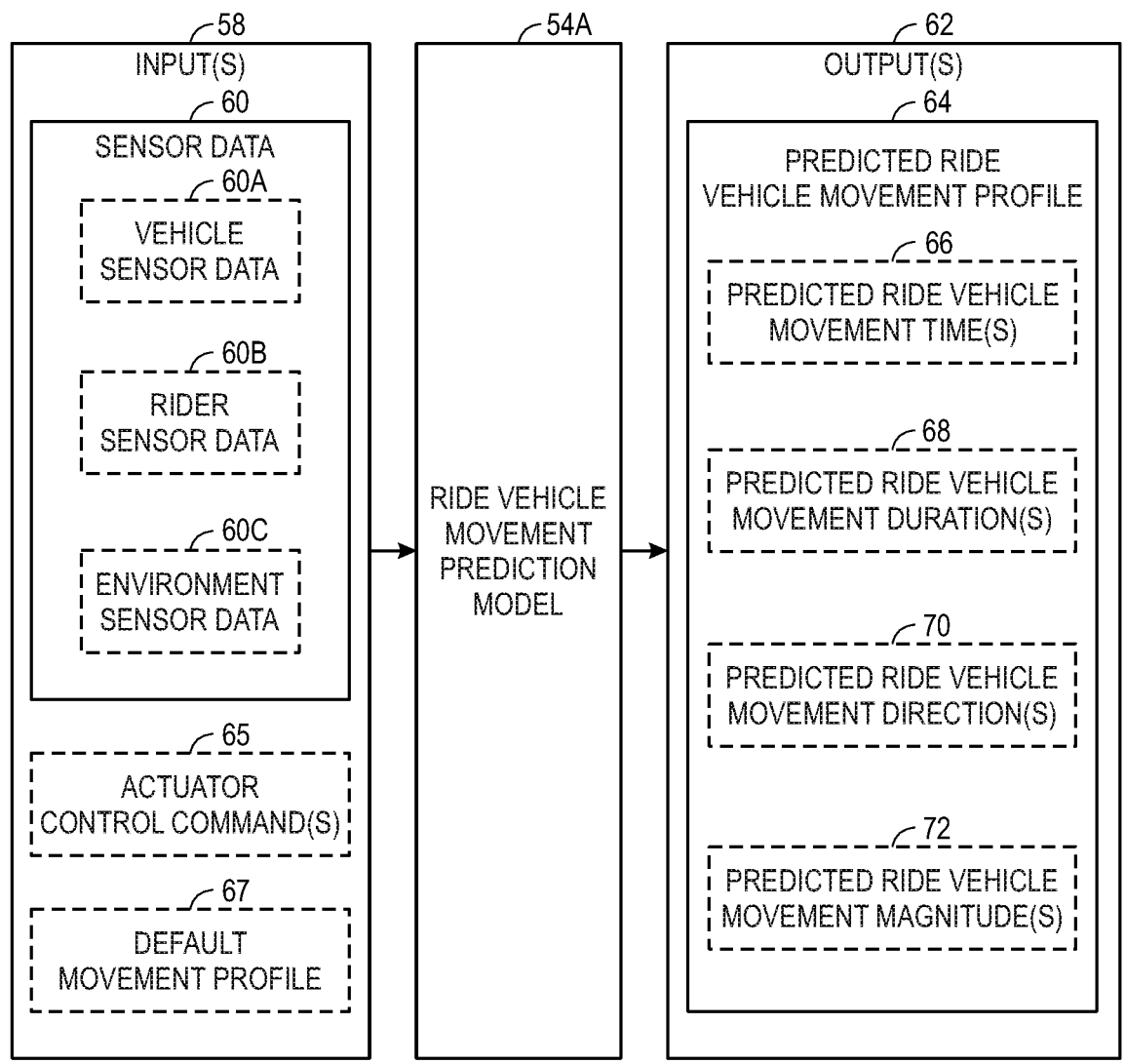
FIG. 4 is a diagrammatic representation of an example of a ride vehicle motion prediction model used by the virtual reality ride system of FIG. 1, in accordance with an embodiment of the present disclosure.

An example of a ride vehicle movement prediction model 56A, which may be deployed in and/or utilized by a virtual reality ride system 10, is shown in FIG. 4. The ride vehicle movement prediction model 56A may receive one or more input parameters 58 including sensor data 60 and determine one or more output parameters 62 indicative of a predicted ride vehicle movement profile (e.g., trajectory) 64 over a prediction horizon. However, it should be appreciated that the depicted example is merely intended to be illustrative and no limiting. In particular, in other embodiments, a ride vehicle movement prediction model 56 may receive other types of input parameters 58 and/or determine other types of output parameters 62.

In fact, as in the depicted example, the input parameters 58 may additionally include one or more actuator control commands 65. As described above, in some embodiments, a ride control sub-system 22 may communicate a control command to an actuator, such as a vehicle actuator 18 or an environment actuator 20, that instructs the actuator to perform a control action, for example, which facilitates controlling movement of a ride vehicle 14 in a ride environment 12. As such, to facilitate determining the predicted ride vehicle movement profile 64, in some embodiments, one or more actuator control commands 65 corresponding with control actions that potentially affect movement of a ride vehicle 14 in the ride environment 12 may be included in the input parameters 58 supplied to the ride vehicle movement prediction model 56A. Additionally or alternatively, the input parameters 58 may include a default movement profile 67 of a ride vehicle 14 in a corresponding ride environment 12. In other embodiments, actuator control commands 65 and/or a default movement profile 67 may not be included in input parameters 58 supplied to a ride vehicle movement prediction model 56, for example, when information indicated by the actuator control commands 65 and/or the default movement profile 67 is obviated by the sensor data 60.

As in the depicted example, the sensor data 60 included in the input parameters 58 may include vehicle sensor data 60A received from one or more vehicle sensors 28A. As described above, when the vehicle sensor 28A includes a proximity sensor 28A deployed on a ride vehicle 14, the vehicle sensor data 60A may be indicative of distance between the ride vehicle 14 and a physical object in a corresponding ride environment 12, such as another ride vehicle 14, a buoy 44, a wall 46, a wave 48, and/or the like. When the vehicle sensor 28A includes an inertial motion vehicle sensor 28A, the vehicle sensor data 60A may be indicative of current and/or previous movement characteristics of the ride vehicle 14.

Additionally, as in the depicted example, the sensor data 60 included in the input parameters 58 may include rider sensor data 60B received from one or more rider sensors 28B. In some embodiments, a rider sensor 28B may be a proximity sensor 28B and, thus, the rider sensor data 60B may be indicative of distance between a corresponding rider 40 and a physical object in a corresponding ride environment 12, such as a specific point on a ride vehicle 14 carrying the rider 40, another ride vehicle 14, a buoy 44, a wall 46, a wave 48, and/or the like. Additionally or alternatively, a rider sensor 28B may be an inertial motion sensor 28B and, thus, the rider sensor data 60B may be indicative of current and/or previous movement characteristics of a rider 40 and, thus, a ride vehicle 14 carrying the rider 40.

Furthermore, as in the depicted example, the sensor data 60 included in the input parameters 58 may include environment sensor data 60C received from one or more environment sensors 28C. As described above, when the environment sensor 28C includes a proximity sensor 28C, the environment sensor data 60C may be indicative of distance between the proximity environment sensor 28C and a physical object in the ride environment 12, such as a ride vehicle 14, a buoy 44, a wall 46, a wave 48, and/or the like. Additionally or alternatively, when the environment sensor 28C includes an inertial motion sensor 28C, the environment sensor data 60C may be indicative of current and/or previous movement characteristics of a physical object in the ride environment 12, such as a buoy 44, a wave 48, a ride vehicle 14, and/or the like.

In other embodiments, environment sensor data 60C may not be included in input parameters 58, for example, when a virtual reality ride system 10 does not include environment sensors 28C. Additionally, in other embodiments, rider sensor data 60B may not be included in input parameters 58, for example, when a virtual reality ride system 10 does not include rider sensors 28B. Furthermore, in other embodiments, vehicle sensor data 60A may not be included in input parameters 58, for example, when a virtual reality ride system 10 does not include vehicle sensors 28A.

As described above, the input parameters 58 supplied to the ride vehicle movement prediction model 56A may be indicative of current and/or previous movement characteristics of a physical object, such as a ride vehicle 14, in the ride environment 12. In other words, the input parameters 58 supplied to the ride vehicle movement prediction model 56A may be indicative of a current movement profile and/or a previous movement profile of the physical object in the ride environment. As such, based at least in part on the input parameters 58, the ride vehicle movement prediction model 56A may determine a predicted ride vehicle movement profile 64 that is expected to occur during a prediction horizon (e.g., subsequent time period). As used herein, a "predicted ride vehicle movement profile" of a ride vehicle 14 describes movement characteristics of the ride vehicle 14 that are predicted (e.g., expected) to occur during a time period—namely a prediction horizon.

Thus, as in the depicted example, the predicted ride vehicle movement profile 64 may include one or more predicted ride vehicle movement times 66. As used herein, a "predicted ride vehicle movement time" describes a predicted start time or a predicted stop time of a specific movement of a ride vehicle 14 during the prediction horizon, for example, indicated as an absolute time and/or a relative ride time. In other words, in some embodiments, the predicted ride vehicle movement times 66 may include a start predicted ride vehicle movement time 66 that indicates a time at which a specific movement of a corresponding ride vehicle 14 starts (e.g., begins). Additionally, in some embodiments, the predicted ride vehicle movement times 66 may include a stop predicted ride vehicle movement time 66 that indicates a time at which a specific movement of a corresponding ride vehicle 14 stops (e.g., ends).

A predicted ride vehicle movement profile 64 may additionally or alternatively include one or more predicted ride vehicle movement durations 68. As used herein, a "predicted ride vehicle movement duration" describes a duration over which a specific movement of a corresponding ride vehicle 14 is predicted to occur during the prediction horizon, for example, indicated in seconds and/or in minutes. Thus, in some embodiments, a predicted ride vehicle movement duration 68 may be determined based at least in part on a time difference between a start predicted ride vehicle movement time 66 and a corresponding stop predicted ride vehicle movement time 66. In fact, in some embodiments, indication of predicted ride vehicle movement times 66 may be obviated by indication of one or more predicted ride vehicle movement durations 68 and, thus, not included in a predicted ride vehicle movement profile 64 output from a ride vehicle movement prediction model 56. In other embodiments, indication of a predicted ride vehicle movement duration 68 may be obviated by indication of predicted ride vehicle movement times 66 and, thus, not included in a predicted ride vehicle movement profile 64 output from a ride vehicle movement prediction model 56.

Furthermore, a predicted ride vehicle movement profile 64 may also include one or more predicted ride vehicle movement directions 70. As used herein, a "predicted ride vehicle movement direction" describes a movement direction (e.g., orientation) of a corresponding ride vehicle 14 that is predicted to occur at a corresponding predicted ride vehicle movement time 66 and/or during a corresponding predicted ride vehicle movement duration 68 in the prediction horizon, for example, indicated in degrees and/or radians. In some embodiments, a predicted ride vehicle movement direction 70 may be determined as an orientation (e.g., offset direction) in a three dimensional (3D) space. Additionally or alternatively, a predicted ride vehicle movement direction 70 may be determined as an orientation in a horizontal plane and an orientation in a vertical plane. Furthermore, in some embodiments, a predicted ride vehicle movement direction 70 may be determined relative to a corresponding ride environment 12. Since portions of a ride environment 12, such as a water body 42 and/or a wave 48, may be in motion, in some embodiments, a predicted ride vehicle movement direction 70 may be additionally or alternatively determined relative to a fixed reference point, such as the Earth.

Moreover, a predicted ride vehicle movement profile 64 may include one or more predicted ride vehicle movement magnitudes 72. As used herein, a "predicted ride vehicle movement magnitude" describes a movement magnitude (e.g., distance) of a corresponding ride vehicle 14 that is predicted to occur at a corresponding predicted ride vehicle movement time 66 and/or during a corresponding predicted ride vehicle movement duration 68 in the prediction horizon, for example, indicated in meters. In some embodiments, a predicted ride vehicle movement magnitude 72 may be determined as a distance (e.g., offset magnitude) in a three dimensional (3D) space. Additionally or alternatively, a predicted ride vehicle movement magnitude 72 may be determined as a distance in a horizontal plane and a distance in a vertical plane.

Furthermore, in some embodiments, a predicted ride vehicle movement magnitude 72 may be determined relative to a corresponding ride environment 12. Since portions of a ride environment 12, such as a water body 42 and/or a wave 48, may be in motion, in some embodiments, a predicted ride vehicle movement magnitude 72 may be additionally or alternatively determined relative to a fixed reference point, such as a corresponding virtual reality ride system 10 as a whole and/or the center of the Earth. For example, the predicted ride vehicle movement magnitude 72 may indicate that a corresponding ride vehicle is predicted to move a specific distance relative to the center of the Earth. In this manner, a ride vehicle movement prediction model 56 may be implemented and/or operated to determine a predicted ride vehicle movement profile 64 that indicates movement characteristics of a corresponding ride vehicle 14 expected to occur during a subsequent period of time (e.g., prediction horizon).

Returning to the virtual reality ride system 10 of FIG. 1, to facilitate reducing likelihood of producing motion sickness, the virtual reality sub-system 16 may generate and present virtual reality content to a rider 40 of a ride vehicle 14 based at least in part on a corresponding predicted ride vehicle movement profile 64. In particular, in some embodiments, the virtual reality sub-system 16 may adapt default virtual reality content 54 to facilitate compensating for movement characteristics indicated in the predicted ride vehicle movement profile 64. For example, the virtual reality sub-system 16 may adapt default virtual reality image content 54 at least in part by translating (e.g., offsetting) the default virtual reality image content 54 in a predicted ride vehicle movement direction 70 to generate adapted (e.g., movement-coordinated) virtual reality image content and display (e.g., present) the adapted virtual reality image content at a corresponding predicted ride vehicle movement time 66.

Figure 5:
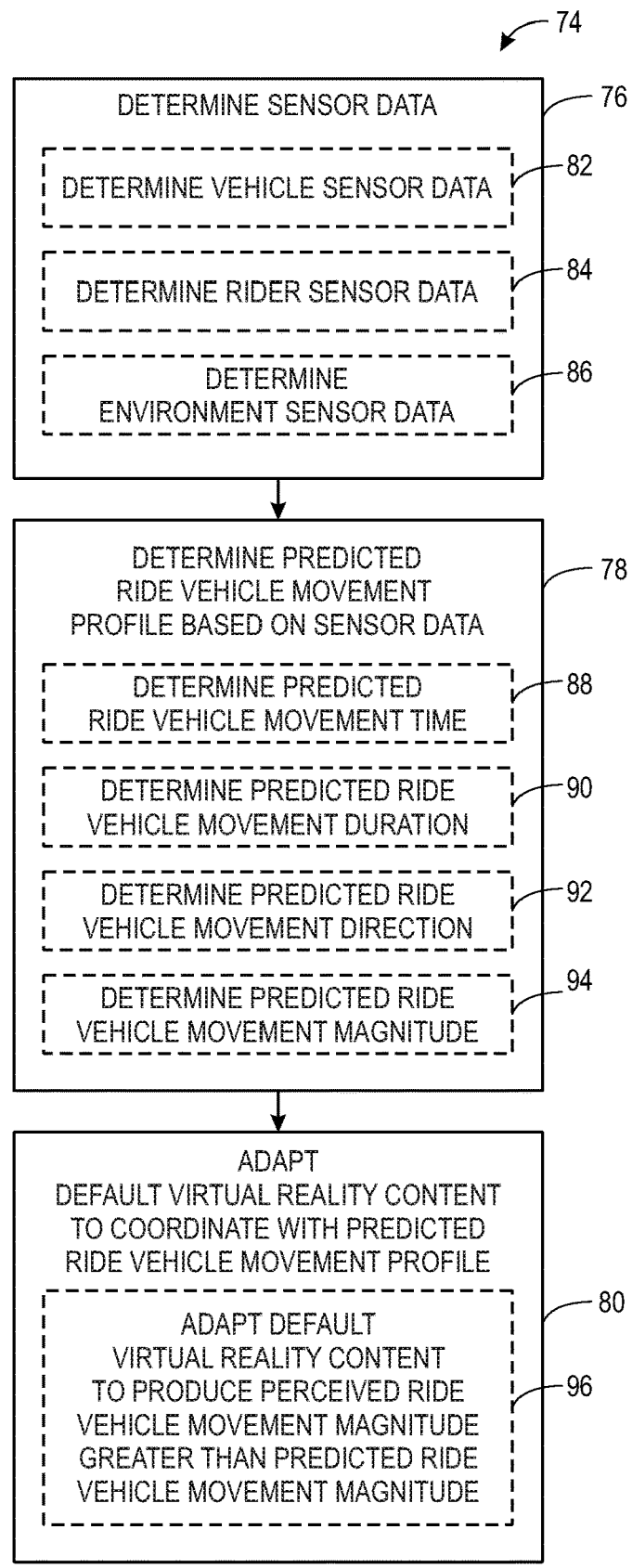
FIG. 5 is a flow diagram of an example process for operating the virtual reality sub-system of FIG. 1, in accordance with an embodiment of the present disclosure.

To help further illustrate, an example of a process 74 for operating a virtual reality sub-system 16, which may be deployed in and/or utilized by a virtual reality ride system 10, is shown in FIG. 5. Generally, the process 74 includes determining sensor data (process block 76) and determining a predicted ride vehicle movement profile based on the sensor data (process block 78). Additionally, the process 74 includes adapting default virtual reality content to coordinate with the predicted ride vehicle movement profile (process block 80).

Although described in a particular order, which represents a particular embodiment, it should be noted that the process 74 may be performed in any suitable order. Additionally, embodiments of the process 74 may omit process blocks and/or include additional process blocks. Moreover, the process 74 may be implemented at least in part by executing instructions stored in a tangible, non-transitory, computer-readable medium, such as virtual reality memory 34, using processing circuitry, such as virtual reality processing circuitry 32.

Accordingly, in some embodiments, a virtual reality sub-system 16 may receive sensor data determined (e.g., measured and/or sensed) by one or more sensors 28. As described above, a virtual reality sub-system 16 may include one or more vehicle sensors 28A. Thus, in some such embodiments, determining the sensor data may include receiving vehicle sensor data 60A output from one or more vehicle sensors 28A (process block 82). As described above, in some embodiments, the vehicle sensor data may be indicative of pose (e.g., orientation and/or location) of a corresponding ride vehicle 14, previous movement characteristics (e.g., profile) of the ride vehicle 14, and/or current movement characteristics of the ride vehicle 14.

Furthermore, as described above, a virtual reality sub-system 16 may include one or more vehicle sensors 28A. Thus, in some such embodiments, determining the sensor data may include receiving rider sensor data 60B output from one or more rider sensors 28B (process block 84). As described above, in some embodiments, the rider sensor data may be indicative of pose of a corresponding rider 40 being carried by a ride vehicle 14.

Moreover, as described above, a virtual reality sub-system 16 may additionally or alternatively include one or more environment sensors 28C. Thus, in some such embodiments, determining the sensor data may include receiving environment sensor data 60C output from one or more environment sensors 28C (process block 86). As described above, in some embodiments, environment sensor data 60C may be indicative of location of a ride vehicle 14 in a corresponding ride environment 12, previous movement characteristics (e.g., profile) of the ride vehicle 14 in the ride environment 12, current movement characteristics of the ride vehicle 14 in the ride environment 12, and/or characteristics of other movement, such as movement of a water body 42 and/or movement of a wave 48, in the ride environment 12.

As described above, a sensor 28 may be communicatively coupled to an I/O interface 30 of a virtual reality sub-system 16 and virtual reality processing circuitry 32 may be communicatively coupled to the I/O interface 30. Thus, in such embodiments, the virtual reality processing circuitry 32 may receive sensor data 60 output from one or more sensors 28 via one or more I/O interfaces 30 implemented in the virtual reality sub-system 16. Additionally, as described above, virtual reality processing circuitry 32 may be communicatively coupled to virtual reality memory 34 storing a ride vehicle movement prediction model 56, for example, which describes expected relationships between sensor data 60 and a predicted ride vehicle movement profile 64 that is expected to occur during a prediction horizon.

Thus, based at least in part on the sensor data, the virtual reality sub-system 16 may determine a predicted ride vehicle movement profile 64 (process block 78). In particular, to facilitate determining the predicted ride vehicle movement profile 64, in some embodiments, the virtual reality processing circuitry 32 may execute a ride vehicle movement prediction model 56 based at least in part on a set of input parameters 58 including the sensor data 60, for example, in addition to one or more actuator control commands 65 and/or a default movement profile of a corresponding ride vehicle 14. As described above, a predicted ride vehicle movement profile 64 of a ride vehicle 14 may indicate predicted movement characteristics, such as movement time, movement duration, movement direction, and/or movement magnitude, of the ride vehicle 14 that are expected to occur during a prediction horizon.

As such, in some embodiments, determining the predicted ride vehicle movement profile 64 may include determining one or more predicted ride vehicle movement times 66 (process block 88). Additionally or alternatively, determining the predicted ride vehicle movement profile 64 may include determining one or more predicted ride vehicle movement durations 68 (process block 90). Furthermore, in some embodiments, determining the predicted ride vehicle movement profile 64 may include determining one or more predicted ride vehicle movement directions 70 (process block 92). Moreover, in some embodiments, determining the predicted ride vehicle movement profile 64 may include determining one or more predicted ride vehicle movement magnitudes 72 (process block 94).

To facilitate reducing likelihood of virtual reality content presentation resulting in motion sickness, the virtual reality sub-system 16 may generate movement-coordinated virtual reality content at least in part by adapting default virtual reality content 54 based on the predicted ride vehicle movement profile 64 (process block 80). In particular, in some embodiments, the virtual reality processing circuitry 32 may generate movement-coordinated virtual reality image content at least in part by translating (e.g., offsetting and/or shifting) default virtual reality image content 54 in a predicted ride vehicle movement direction 70. In this manner, the virtual reality sub-system 16 may generate movement-coordinated virtual reality image content, which when displayed (e.g., presented), results in a perceived movement direction that matches the predicted ride vehicle movement direction 70.

Additionally or alternatively, the virtual reality processing circuitry 32 may generate the movement-coordinated virtual reality image content at least in part by adding virtual content to the default virtual reality image content 54, for example, such that the movement-coordinated virtual reality image content visually depicts a cause and/or a result of a physical ride vehicle movement. In some embodiments, the virtual reality processing circuitry 32 may additionally set a target presentation (e.g., display) time of the movement-coordinated virtual reality image content to match a predicted ride vehicle movement time 66. In other words, in this manner, the virtual reality sub-system 16 may generate the movement-coordinated virtual reality image content for display at a presentation time that matches the predicted ride vehicle movement time 66. Additionally or alternatively, the virtual reality processing circuitry 32 may set a target presentation (e.g., display) duration of the movement-coordinated virtual reality image content to match a predicted ride vehicle movement duration 68. In this manner, the virtual reality sub-system 16 may generate the movement-coordinated virtual reality image content for display during a presentation duration that matches the predicted ride vehicle movement duration 68.

Moreover, in some embodiments, the virtual reality processing circuitry 32 may generate the movement-coordinated virtual reality image content at least in part by translating the default virtual reality image content 54 a distance determined based at least in part a predicted ride vehicle movement magnitude 72, for example, in a direction indicated by a corresponding predicted ride vehicle movement direction 70. In fact, in some embodiments, the virtual reality processing circuitry 32 may generate the movement-coordinated virtual reality image content such that presentation results in a perceived ride vehicle movement magnitude that differs from a corresponding predicted ride vehicle movement magnitude 72. For example, to facilitate providing a more exhilarating (e.g., improved) ride experience, the virtual reality processing circuitry 32 may generate movement-coordinated virtual reality content at least in part by adapting the default virtual reality content 54 to produce a perceived ride vehicle movement magnitude greater than a corresponding predicted ride vehicle movement magnitude 72 (process block 96). In other words, the movement-coordinated virtual reality content may include movement-exaggerated virtual reality content, which when presented to a rider 40 of a ride vehicle 14, exaggerates magnitude of a physical movement of the ride vehicle 14.

Figure 6:
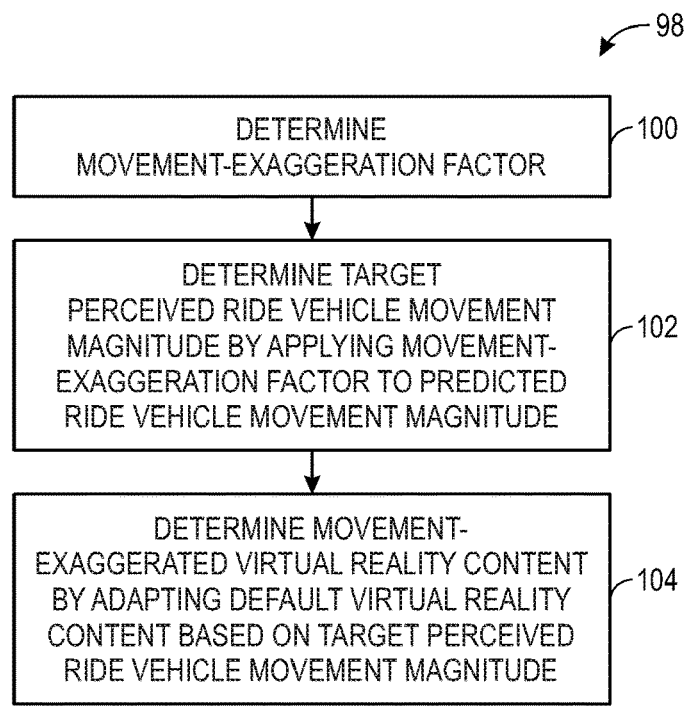
FIG. 6 is a flow diagram of an example process for generating motion exaggerated virtual reality content, in accordance with an embodiment of the present disclosure.

To help illustrate, an example of a process 98 for generating movement-exaggerated virtual reality content is described in FIG. 6. Generally, the process 98 includes determining a movement-exaggeration factor (process block 100) and determining a target perceived ride vehicle movement magnitude by applying the movement-exaggeration factor to a predicted ride vehicle movement magnitude (process block 102). Additionally, the process 98 includes determining movement-exaggerated virtual reality content by adapting default virtual reality content based on the targeted perceived ride vehicle movement magnitude (process block 104).

Although described in a particular order, which represents a particular embodiment, it should be noted that the process 98 may be performed in any suitable order. Additionally, embodiments of the process 98 may omit process blocks and/or include additional process blocks. Moreover, the process 98 may be implemented at least in part by executing instructions stored in a tangible, non-transitory, computer-readable medium, such as virtual reality memory 34, using processing circuitry, such as virtual reality processing circuitry 32.

Accordingly, in some embodiments, virtual reality processing circuitry 32 in a virtual reality sub-system 16 may determine one or more movement-exaggeration factors (process block 100). As will be described in more detail below, in some embodiments, a movement-exaggeration factor may be pre-determined by a design system via a calibration process and stored in a tangible, non-transitory, computer-readable medium, such as virtual reality memory 34. Thus, in such embodiments, the virtual reality processing circuitry 32 may retrieve the movement-exaggeration factor from the tangible, non-transitory, computer-readable medium.

In some embodiments, the movement-exaggeration factors may include one or more offset (e.g., bias) values. Additionally or alternatively, the movement-exaggeration factors may include one or more gain (e.g., scale) values. In fact, in some embodiments, virtual reality processing circuitry 32 may adaptively (e.g., dynamically) determine the value of one or more movement-exaggeration factors to be applied based on potentially varying operating factors, such as content of virtual reality content and/or predicted ride vehicle movement characteristics. In other words, in some embodiments, the virtual reality processing circuitry 32 may select different movement-exaggeration factors under differing operating factors.

For example, the virtual reality processing circuitry 32 may apply a larger movement-exaggeration factor to generate motion exaggerated virtual reality content corresponding with a ride climax, such as a fight scene. As another example, the virtual reality processing circuitry 32 may apply a larger movement-exaggeration factor to generate motion exaggerated virtual reality content corresponding with a longer predicted ride vehicle movement duration 68 and a smaller movement-exaggeration factor to generate motion exaggerated virtual reality content corresponding with a shorter predicted ride vehicle movement duration 68 or vice versa. As a further example, the virtual reality processing circuitry 32 may apply a larger movement-exaggeration factor to generate motion exaggerated virtual reality content corresponding with a larger predicted ride vehicle movement magnitude 72 and a smaller movement-exaggeration factor to generate motion exaggerated virtual reality content corresponding with smaller predicted ride vehicle movement magnitude 72 or vice versa.

The virtual reality processing circuitry 32 may then apply the one or more movement-exaggeration factors to a predicted ride vehicle movement magnitude 72 to determine a target perceived ride vehicle movement magnitude (process block 102). For example, when a movement-exaggeration factor is an offset value, the virtual reality processing circuitry 32 may apply the movement-exaggeration factor to determine a target perceived ride vehicle movement magnitude biased relative to the predicted ride vehicle movement magnitude 72. Additionally or alternatively, when a movement-exaggeration factor is a gain value, the virtual reality processing circuitry 32 may apply the movement-exaggeration factor to determine a target perceived ride vehicle movement magnitude scaled relative to the predicted ride vehicle movement magnitude 72.

To determine movement-exaggerated virtual reality content, the virtual reality processing circuitry 32 may adapt the default virtual reality content 54 based at least in part on the target perceived ride vehicle movement magnitude (process block 104). For example, the virtual reality processing circuitry 32 may generate movement-exaggerated virtual reality image content at least in part by adapting (e.g., translating and/or shifting) default virtual reality image content 54 such that, when displayed, the movement-exaggerated virtual reality image content results in the target perceived ride vehicle movement magnitude. In other words, in such embodiments, the virtual reality processing circuitry 32 may determine movement-exaggerated virtual reality content included in movement coordinate virtual reality content based at least in part on a target perceived ride vehicle movement magnitude that differs from a corresponding predicted ride vehicle movement magnitude 72.

To facilitate reducing likelihood of producing motion sickness, as described above, a virtual reality sub-system 16 may present the movement-coordinated virtual reality content to a rider 40 of a ride vehicle 14 in coordination with predicted movement characteristics of the ride vehicle 14. For example, in some embodiments, virtual reality processing circuitry 32 may instruct one or more (e.g., haptic) vehicle actuators 18 to present movement-coordinated virtual reality tactile content at a corresponding predicted ride vehicle movement time 66 and/or during a corresponding predicted ride vehicle movement duration 68. Additionally, in some embodiments, the virtual reality processing circuitry 32 may instruct one or more audio speakers 38 to present movement-coordinated virtual reality audio content at a corresponding predicted ride vehicle movement time 66 and/or during a corresponding predicted ride vehicle movement duration 68. Furthermore, in some embodiments, the virtual reality processing circuitry 32 may additionally or alternatively instruct one or more electronic displays 36 to present (e.g., display) movement-coordinated virtual reality image content at a corresponding predicted ride vehicle movement time 66 and/or during a corresponding predicted ride vehicle movement duration 68.

However, as described above, at least in some instances, a rider 40 on a ride vehicle 14 of a virtual reality ride system 10 may experience motion sickness when sensory (e.g., visual and vestibular) systems of the rider 40 detect differing movement characteristics. Additionally, as described above, motion exaggerated virtual reality content included in motion coordinated virtual reality content may be generated based on a target perceived ride vehicle movement magnitude that differs from (e.g., greater than) a corresponding predicted ride vehicle movement magnitude 72. In other words, the perceived ride vehicle movement magnitude resulting from presentation of motion exaggerated virtual reality content may differ from the predicted ride vehicle movement magnitude 72 and, thus, potentially differ from a corresponding actual movement magnitude of the ride vehicle 14.

As such, to facilitate providing a more exhilarating ride experience with reduced likelihood of producing motion sickness, in some embodiments, determination of motion exaggerated virtual reality content may be calibrated (e.g., tuned) via a calibration (e.g., tuning) process. In particular, in such embodiments, the calibration process may be performed to determine the value of one or more movement-exaggeration factors to be applied to a predicted ride vehicle movement magnitude 72. Additionally, in some embodiments, the calibration process may be performed by a design system, for example, offline, before deployment of a virtual reality sub-system 16 in a virtual reality ride system 10, and/or before an operation cycle of the virtual reality sub-system 16.

Figure 7:
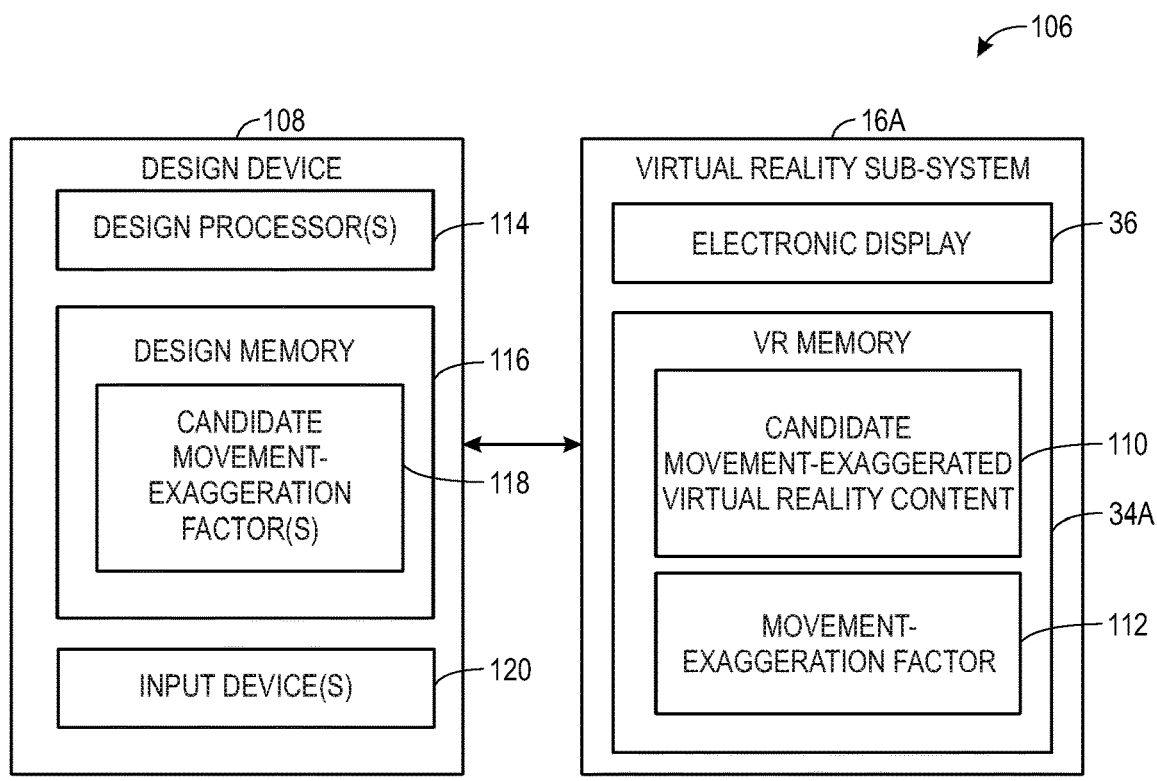
FIG. 7 is a block diagram of an example of a design device communicatively coupled to the virtual reality sub-system of FIG. 1, in accordance with an embodiment of the present disclosure.

To help illustrate, an example of a design (e.g., calibration and/or tuning) system 106 is shown in FIG. 7. As in the depicted example, the design system 106 includes a design device 108 communicatively coupled to a virtual reality sub-system 16A. In other embodiments, a design system 106 may include multiple (e.g., more than one) design devices 108. Additionally or alternatively, in other embodiments, a design device 108 may only be communicatively coupled to a virtual reality sub-system 16 after completion of the calibration process.

As described above, a virtual reality sub-system 16 may include an electronic display 36 and virtual reality (VR) memory 34. Additionally, as described above, virtual reality memory 34 may store instructions and/or data to be used by a virtual reality sub-system 16. In particular, as in the depicted example, the data stored in the virtual reality memory 34A may include candidate movement-exaggerated virtual reality content 110 and a movement-exaggeration factor 112, for example, determined via a calibration process performed by the design device 108.

To facilitate performing a calibration process, as in the depicted example, the design device 108 may include one or more design processors 114 (e.g., control circuitry and/or processing circuitry) and design memory 116. In some embodiments, the design memory 116 may store data to be used by the one or more design processors 114. In particular, as in the depicted example, the data stored in the design memory 116 may include one or more candidate movement-exaggeration factors 118. Thus, in some embodiments, the design memory 116 may include one or more tangible, non-transitory, computer-readable media. For example, the design memory 116 may include one or more random access memory (RAM) devices, one or more read only memory (ROM) devices, one or more rewritable non-volatile memory devices, such as a flash memory drive, a hard disk drive, an optical disc drive, and/or the like.

In addition to data, in some embodiments, the design memory 116 may store instructions to be executed by processing circuitry, such as a design processor 114. For example, the one or more design processors 114 may execute instructions stored in the design memory 116 to generate candidate movement-exaggerated virtual reality content 110 corresponding with the one or more candidate movement-exaggeration factors 118. Additionally or alternatively, a design processor 114 may operate based on circuit connections formed therein. As such, in some embodiments, the one or more design processors 144 may include one or more general purpose microprocessors, one or more application specific processors (ASICs), one or more field programmable logic arrays (FPGAs), or any combination thereof.

Furthermore, as in the depicted example, the design device 108 may include one or more input devices 120. In other embodiments, one or more input devices 120 may additionally or alternatively be included in a virtual reality sub-system 16. In any case, an input device 120 may generally be implemented and/or operated to receive a user (e.g., operator) input. As such, in some embodiments, the input devices 120 may include one or more buttons, one or more keyboards, one or more mice, one or more trackpads, and/or the like. For example, to facilitate selecting a movement-exaggeration factor 112 from multiple candidate movement-exaggeration factors 118 during a calibration process, an input device 120 may receive a user input that indicates whether presentation of corresponding candidate movement-exaggerated virtual reality content results in motion sickness.

Figure 8:
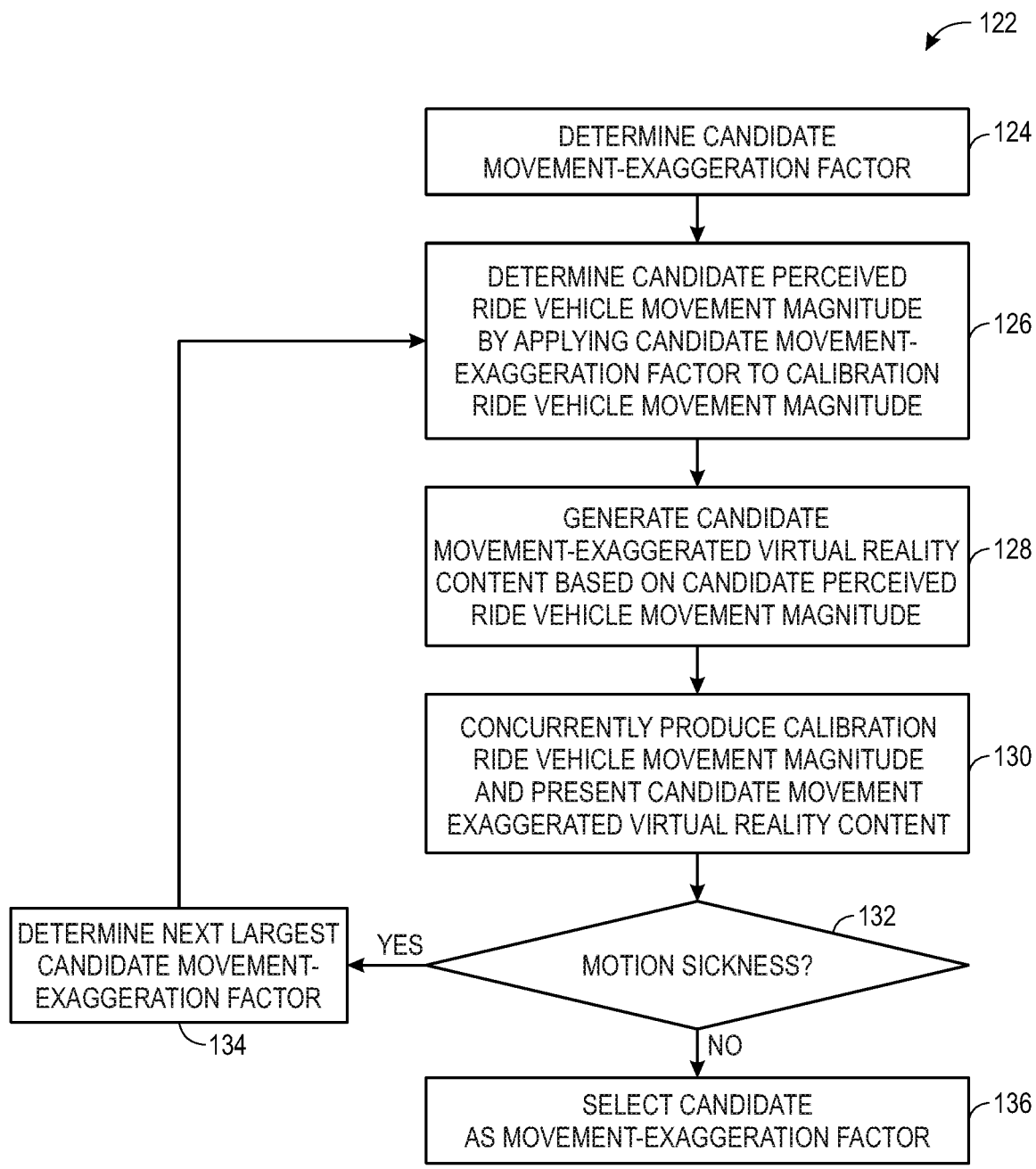
FIG. 8 is flow diagram of an example process for operating the design device of FIG. 7, in accordance with an embodiment of the present disclosure.

To help further illustrate, an example of a calibration process 122, which may be performed by a design system 106 and/or a design device 108, is described in FIG. 8.

Generally, the calibration process 122 includes determining a candidate movement-exaggeration factor (process block 124), determining a candidate perceived ride vehicle movement magnitude by applying the candidate movement-exaggeration factor to a calibration ride vehicle movement magnitude (process block 126), and generating candidate movement-exaggerated virtual reality content based on the candidate perceived ride vehicle movement magnitude (process block 128). Additionally, the calibration process 122 includes concurrently producing the calibration ride vehicle movement magnitude and presenting the candidate movement-exaggerated virtual reality content (process block 130), determining whether motion sickness results (decision block 132), determining a next largest candidate movement-exaggeration factor when motion sickness results (process block 134), and selecting the candidate as a movement-exaggeration factor when motion sickness does not result (process block 136).

Although described in a particular order, which represents a particular embodiment, it should be noted that the calibration process 122 may be performed in any suitable order. Additionally, embodiments of the calibration process 122 may omit process blocks and/or include additional process blocks. Furthermore, in some embodiments, the calibration process 122 may be performed at least in part by a manufacturer that produces a virtual reality sub-system 16 and/or a system integrator that produces a virtual reality ride system 10. Moreover, in some embodiments, the calibration process 122 may be implemented at least in part by executing instructions stored in a tangible, non-transitory, computer-readable medium, such as design memory 116, using processing circuitry, such as one or more design processors 114.

Accordingly, in some embodiments, a design device 108 may determine one or more candidate movement-exaggeration factors 118 (process block 124). In particular, in some embodiments, the design device 108 may determine multiple candidate movement-exaggeration factors 118 each with a different value. Additionally, to facilitate providing a more exhilarating ride experience, in some embodiments, the design device 108 may evaluate the candidate movement-exaggeration factors 118 in descending value order. In other words, in such embodiments, the design device 108 may evaluate a candidate movement-exaggeration factor 118 with the largest value before other candidate movement-exaggeration factors 118.

By applying a candidate movement-exaggeration factor 118 to a calibration ride vehicle magnitude, the design device 108 may determine a candidate perceived ride vehicle movement magnitude corresponding with the candidate movement-exaggeration factor 118 (process block 126). In particular, the calibration ride vehicle magnitude may be the movement magnitude of a ride vehicle 14 in a ride environment 12. In other words, the candidate perceived ride vehicle movement magnitude may match a target perceived ride vehicle movement magnitude resulting from application of the candidate movement-exaggeration factor 118 to a predicted ride vehicle movement magnitude 72 that matches the calibration ride vehicle magnitude.

Based at least in part on the candidate ride vehicle movement magnitude, the design device 108 may generate candidate movement-exaggerated virtual reality content 110 (process block 128). In some embodiments, the design device 108 may generate candidate movement-exaggerated virtual reality content 110 at least in part by adapting default virtual reality content 54 based at least in part on the candidate ride vehicle movement magnitude. For example, to generate candidate movement-exaggerated virtual reality image content 110, the design device 108 may shift (e.g., translate) default virtual reality image content 54 by the candidate ride vehicle movement magnitude.

The design device 108 may then instruct a virtual reality sub-system 16 to concurrently produce the calibration ride movement magnitude and present the candidate movement-exaggerated virtual reality content (process block 130). For example, the design device 108 may instruct the virtual reality sub-system 16 to present (e.g., display) candidate movement-exaggerated virtual reality image content 110 to a rider 40 of a ride vehicle 14. As described above, in some embodiments, movement of a ride vehicle 14 in a ride environment 12 of a virtual reality ride system 10 may be controlled at least in part by controlling operation of one or more actuators, such as a vehicle actuator 18 and/or an environment actuator 20. Thus, in such embodiments, the design device 108 may instruct the virtual reality ride system 10 to produce the calibration ride movement magnitude at least in part by controlling the one or more actuators. Additionally or alternatively, the design device 108 may instruct the virtual reality sub-system 16 to artificially produce the calibration ride movement magnitude, for example, via one or more calibration (e.g., temporary) actuators coupled to a ride vehicle 14 during the calibration process 122.

The design device 108 may then determine whether motion sickness results from presenting the candidate movement-exaggerated virtual reality content concurrently with occurrence of the calibration ride vehicle movement magnitude (decision block 132). In some embodiments, the design device 108 may determine whether motion sickness results based at least in part on a user (e.g., rider) input received from the rider 40 of the ride vehicle 14 via one or more input devices 120. For example, the design device 108 may determine that motion sickness results when the user input selects a first input device 120 (e.g., YES button) and that motion sickness does not result when the user input selects a second (e.g., different) input device 120 (e.g., NO button).

When motion sickness does not result, the design device 108 may select the candidate movement-exaggeration factor 118 as a movement-exaggeration factor 112 to be applied during subsequent operation of the virtual reality sub-system 16, for example, after deployment in a virtual reality ride system 10 (process block 136). As described above, in some embodiments, the selected movement-exaggeration factor 112 may be stored in a tangible, non-transitory, computer-readable medium in the virtual reality sub-system 16, such as virtual reality memory 34A. When motion sickness results, the design device 108 may determine a next largest candidate movement-exaggeration factor 118 (process block 134).

The design device 108 may then evaluate the next largest candidate movement-exaggeration factor 118 in a similar manner. In other words, the design device 108 may determine another candidate perceived ride vehicle movement magnitude by applying the next largest candidate movement-exaggeration factor 118 to the calibration ride vehicle magnitude (process block 126), generate other candidate movement-exaggerated virtual reality content based on the other candidate perceived ride vehicle movement magnitude (process block 128), concurrently producing the calibration ride vehicle movement magnitude and presenting the other candidate movement-exaggerated virtual reality content (process block 130), determining whether motion sickness results (decision block 132), selecting the next largest candidate as the movement-exaggeration factor when motion sickness does not result (process block 136), determining another next largest candidate movement-exaggeration factor when motion sickness results (process block 134). In this manner, the techniques described in the present disclosure may facilitate reducing the likelihood of producing motion sickness while providing a more exhilarating and, thus, improved virtual reality ride experience.

The specific embodiments described above have been shown by way of example. It should be understood that these embodiments may be susceptible to various modifications and/or alternative forms. It should be further understood that the claims are not intended to be limited to the particular forms disclosed, but rather to cover all modifications, equivalents, and alternatives falling within the spirit and scope of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A virtual reality ride system comprising:
an electronic display configured to present virtual reality image content to a rider while the rider is being carried through a variable ride environment by a ride vehicle configured to traverse the variable ride environment;
one or more sensors configured to determine sensor data indicative of movement characteristics of the ride vehicle in the variable ride environment; and
virtual reality processing circuitry communicatively coupled to the electronic display and the one or more sensors, wherein the virtual reality processing circuitry is configured to:
determine a predicted movement profile of the ride vehicle within the variable ride environment based at least in part on the sensor data received from the one or more sensors, wherein the predicted movement profile indicates that the ride vehicle is expected to move a predicted movement magnitude during a predicted movement duration;
determine a target perceived movement magnitude greater than the predicted movement magnitude at least in part by applying a movement-exaggeration factor to the predicted movement magnitude; and
determine movement-exaggerated virtual reality image content to be presented on the electronic display during the predicted movement duration at least in part by adapting default virtual reality image content to incorporate the target perceived movement magnitude.

2. The virtual reality ride system of claim 1, wherein the virtual reality ride system is a roller coaster ride system, a lazy river ride system, a log flume ride system, a boat ride system, a drop tower ride system, a pendulum ride system, a swing ride system, a scrambler ride system, or a robotic arm ride system.

3. The virtual reality ride system of claim 1, wherein the virtual reality processing circuitry is configured to instruct the electronic display to display the movement-exaggerated virtual reality image content during the predicted movement duration corresponding with the predicted movement magnitude.

4. The virtual reality ride system of claim 1, wherein the virtual reality processing circuitry is configured to determine the movement-exaggerated virtual reality image content at least in part by translating the default virtual reality image content a distance corresponding with the target perceived movement magnitude.

5. The virtual reality ride system of claim 1, wherein:
the predicted movement profile indicates that the ride vehicle is expected to move within the variable ride environment an additional predicted movement magnitude during an additional predicted movement duration; and
the virtual reality processing circuitry is configured to:
determine an additional target perceived movement magnitude greater than the additional predicted movement magnitude at least in part by applying an additional movement-exaggeration factor to the additional predicted movement magnitude; and
determine additional movement-exaggerated virtual reality image content to be presented on the electronic display during the additional predicted movement duration at least in part by adapting additional default virtual reality image content to incorporate the additional target perceived movement magnitude.

6. The virtual reality ride system of claim 5, wherein a value of the movement-exaggeration factor applied to the predicted movement magnitude is different from a value of the additional movement-exaggeration factor applied to the additional predicted movement magnitude when:
image content of the movement-exaggerated virtual reality image content to be presented on the electronic display during the predicted movement duration differs from the additional movement-exaggerated virtual reality image content to be presented on the electronic display during the additional predicted movement duration;
the predicted movement magnitude of the ride vehicle expected to occur during the predicted movement duration differs from the additional predicted movement magnitude of the ride vehicle that is expected to occur during the additional predicted movement duration;
duration of the predicted movement duration differs from duration of the additional predicted movement duration; or
any combination thereof.

7. The virtual reality ride system of claim 1, wherein the movement-exaggeration factor comprises an offset value, a gain value, or both.

8. The virtual reality ride system of claim 1, wherein:
the predicted movement profile indicates that the ride vehicle is expected to move in a predicted movement direction within the variable ride environment during the predicted movement duration; and
the virtual reality processing circuitry is configured to determine the movement-exaggerated virtual reality image content to be presented on the electronic display during the predicted movement duration at least in part by adapting the default virtual reality image content to incorporate a perceived movement direction that matches the predicted movement direction of the ride vehicle.

9. The virtual reality ride system of claim 1, wherein the virtual reality processing circuitry is configured to determine the predicted movement profile of the ride vehicle by extrapolating a ride vehicle movement prediction model that at least in part describes one or more expected relationships between the sensor data and subsequent movement characteristics of the ride vehicle.

10. The virtual reality ride system of claim 1, wherein:
the variable ride environment comprises a water body and at least one buoy configured to float on the water body; and
the one or more sensors comprise an environment sensor implemented on the at least one buoy, wherein the environment sensor is configured to determine sensor data indicative of proximity of the ride vehicle to the at least one buoy, movement characteristics of the at least one buoy, movement characteristics of a wave in the water body, or any combination thereof.

11. The virtual reality ride system of claim 1, wherein:
the variable ride environment comprises a water body and a wall adjacent the water body; and
the one or more sensors comprise at least one environment sensor positioned on the wall, wherein the at least one environment sensor is configured to determine sensor data indicative of proximity of the ride vehicle to the wall, movement characteristics of a wave in the water body, or both.

12. The virtual reality ride system of claim 1, wherein the ride vehicle is configured to traverse a variable path of a plurality of variable paths defined by the variable ride environment during a first pass through the virtual reality ride system, and wherein the ride vehicle is configured to traverse an additional variable path of the plurality of variable paths, different than the variable path, during a second pass through the virtual reality ride system.

13. A method of operating a virtual reality ride system, comprising:
receiving, using processing circuitry implemented in the virtual reality ride system, sensor data determined by one or more sensors while a ride vehicle is moving through a variable ride environment of the virtual reality ride system, wherein the variable ride environment defines a plurality of variable paths through which the ride vehicle is configured to traverse;
predicting, using the processing circuitry and a ride vehicle movement prediction model, a movement magnitude that the ride vehicle will experience within the variable ride environment at a time during a prediction horizon based at least in part on the sensor data received from the one or more sensors;
determining, using the processing circuitry, a target perceived movement magnitude corresponding with the time during the prediction horizon at least in part by applying one or more movement-exaggeration factors to the movement magnitude that the ride vehicle is predicted to experience within the variable ride environment at the time during the prediction horizon; and
determining, using the processing circuitry, movement-exaggerated virtual reality content to be presented to a rider of the ride vehicle at the time by adapting default virtual reality content corresponding with the time during the prediction horizon based at least in part on the target perceived movement magnitude.

14. The method of claim 13, comprising instructing, using the processing circuitry, an electronic display carried by the ride vehicle to display the movement-exaggerated virtual reality content at the time.

15. The method of claim 13, comprising:
predicting, using the processing circuitry, an additional movement magnitude that the ride vehicle will experience within the variable ride environment at an additional time during the prediction horizon based at least in part on the sensor data received from the one or more sensors;
determining, using the processing circuitry, an additional target perceived movement magnitude corresponding with the additional time during the prediction horizon at least in part by applying the one or more movement-exaggeration factors to the additional movement magnitude that the ride vehicle is predicted to experience within the variable ride environment at the additional time during the prediction horizon; and
determining, using the processing circuitry, additional movement-exaggerated virtual reality content to be presented to a rider of the ride vehicle at the additional time by adapting default virtual reality content corresponding with the additional time during the prediction horizon based at least in part on the additional target perceived movement magnitude.

16. The method of claim 13, comprising predicting, using the processing circuitry, a movement direction that the ride vehicle will experience within the variable ride environment at the time during the prediction horizon based at least in part on the sensor data received from the one or more sensors, wherein adapting the default virtual reality to determine the movement-exaggerated virtual reality content comprises:
shifting the default virtual reality content in a direction corresponding with the movement direction that the ride vehicle is predicted to experience within the variable ride environment at the time; and
shifting the default virtual reality content a distance corresponding with the target perceived movement magnitude that differs from the movement magnitude that the ride vehicle is predicted to experience within the variable ride environment at the time.

17. A tangible, non-transitory, computer readable medium storing instructions executable by one or more processors of a virtual reality ride system, wherein the instructions comprise instructions to:
determine, using the one or more processors, sensor data measured by one or more sensors as a ride vehicle is carrying a rider through a changeable ride environment of the virtual reality ride system, wherein the ride vehicle is configured to traverse a variable path of a plurality of variable paths defined by the changeable ride environment;
determine, using the one or more processors, a predicted movement magnitude of the ride vehicle within the changeable ride environment that is predicted to occur during a subsequent time period based at least in part on the sensor data measured by the one or more sensors; and
determine, using the one or more processors, movement-exaggerated virtual reality image content based at least in part on the predicted movement magnitude such that presentation of the movement-exaggerated virtual reality image content to the rider results in a perceived movement magnitude that differs from the predicted movement magnitude of the ride vehicle within the changeable ride environment.

18. The tangible, non-transitory, computer readable medium of claim 17, comprising instructions to instruct, using the one or more processors, an electronic display carried by the ride vehicle to display the movement-exaggerated virtual reality image content during the subsequent time period in which the predicted movement magnitude of the ride vehicle is predicted to occur.

19. The tangible, non-transitory, computer readable medium of claim 17, wherein the instructions to determine the movement-exaggerated virtual reality image content comprise instructions to:
   determine a target magnitude of the perceived movement magnitude that differs from the predicted movement magnitude at least in part by applying one or more movement-exaggeration factors to the predicted movement magnitude of the ride vehicle; and
   offsetting default virtual reality image content corresponding with the subsequent time period a distance corresponding with the target magnitude of the perceived movement magnitude that differs from the predicted movement magnitude of the ride vehicle.

20. The tangible, non-transitory, computer readable medium of claim 17, comprising instructions to determine, using the one or more processors, a predicted movement direction of the ride vehicle that is predicted to occur during the subsequent time period based at least in part on the sensor data measured by the one or more sensors, wherein the instructions to determine the movement-exaggerated virtual reality image content comprise instructions to:
   offset default virtual reality image content corresponding with the subsequent time period in a direction corresponding with the predicted movement direction of the ride vehicle that is predicted to occur during the subsequent time period; and
   offset the default virtual reality content corresponding with the subsequent time period a distance corresponding with a target magnitude of the perceived movement magnitude that differs from the predicted movement magnitude of the ride vehicle.

* * * * *